United States Patent
Johnston, Jr.

(10) Patent No.: US 11,288,699 B2
(45) Date of Patent: Mar. 29, 2022

(54) DIGITAL ADVERTISING PLATFORM WITH DEMAND PATH OPTIMIZATION

(71) Applicant: Pubwise, LLLP, Atlanta, GA (US)

(72) Inventor: Stephen F. Johnston, Jr., Marietta, GA (US)

(73) Assignee: PUBWISE, LLLP, Atlanta, GA (US)

( * ) Notice: Subject to any disclaimer, the term of this patent is extended or adjusted under 35 U.S.C. 154(b) by 7 days.

(21) Appl. No.: 16/512,247

(22) Filed: Jul. 15, 2019

(65) Prior Publication Data

US 2020/0019983 A1 Jan. 16, 2020

Related U.S. Application Data

(60) Provisional application No. 62/697,976, filed on Jul. 13, 2018.

(51) Int. Cl.
*G06Q 30/00* (2012.01)
*G06Q 30/02* (2012.01)
*G06N 20/00* (2019.01)

(52) U.S. Cl.
CPC ......... *G06Q 30/0244* (2013.01); *G06N 20/00* (2019.01); *G06Q 30/0275* (2013.01)

(58) Field of Classification Search
CPC .................................................. G06N 20/00
See application file for complete search history.

(56) References Cited

U.S. PATENT DOCUMENTS

| | | |
|---|---|---|
| 5,948,061 A | 9/1999 | Merriman et al. |
| 6,108,703 A | 8/2000 | Leighton et al. |
| 6,285,987 B1 | 9/2001 | Roth et al. |
| 6,324,519 B1 | 11/2001 | Eldering |
| 6,487,538 B1 | 11/2002 | Gupta et al. |
| 6,546,427 B1 | 4/2003 | Ehrlich et al. |
| 6,590,529 B2 | 7/2003 | Schwoegler |
| 6,687,737 B2 | 2/2004 | Landsman et al. |

(Continued)

FOREIGN PATENT DOCUMENTS

| | | |
|---|---|---|
| CA | 2673352 A1 | 6/2008 |
| JP | 2002163549 A | 6/2002 |

(Continued)

OTHER PUBLICATIONS

PCT/US2019/041892—International Search Report and Written Opinion of the ISA, dated Oct. 8, 2019,—10 pages.

*Primary Examiner* — Alvin L Brown
(74) *Attorney, Agent, or Firm* — Eleanor Musick; Torrey Pines Law Group PC

(57) ABSTRACT

A digital advertising system includes at least one processor configured to execute a plurality of functional modules including an analytics module to receive and analyze client attributes associated with a website visitor and a requested website to define an analytics event. The analytics module ingests and enriches data within the analytics event and provides it to a machine learning module that generates prediction models for potential bids. A management platform receives the bidding prediction and generates candidate configs. An optimization module receives the candidate configs and applies weights and additional features to select a config and generate an optimized script for the selected config. A deployment module receives the optimized script and delivers the script to the website visitor.

26 Claims, 16 Drawing Sheets

(56) References Cited

U.S. PATENT DOCUMENTS

| | | |
|---|---|---|
| 6,725,203 B1 | 4/2004 | Seet et al. |
| 6,736,148 B2 | 5/2004 | Davis et al. |
| 6,757,571 B1 | 6/2004 | Toyama |
| 6,763,334 B1 | 7/2004 | Matsumoto et al. |
| 6,892,193 B2 | 5/2005 | Bolle et al. |
| 6,937,744 B1 | 8/2005 | Toyama |
| 6,954,783 B1 | 10/2005 | Bodwell et al. |
| 6,973,438 B1 | 12/2005 | Philyaw |
| 7,038,637 B1 | 5/2006 | Eller et al. |
| 7,076,244 B2 | 7/2006 | Lazaridis et al. |
| 7,085,732 B2 | 8/2006 | Gould |
| 7,085,817 B1 | 8/2006 | Tock et al. |
| 7,406,498 B2 | 7/2008 | Reshef et al. |
| 7,428,555 B2 | 9/2008 | Yan |
| 7,475,404 B2 | 1/2009 | Hamel |
| 7,650,420 B2 | 1/2010 | Chong et al. |
| 7,882,046 B1 | 2/2011 | Kizhakkekalathil et al. |
| 7,917,491 B1 | 3/2011 | Sack |
| 7,958,040 B2 | 6/2011 | Jain et al. |
| 8,331,228 B2 | 12/2012 | Huber et al. |
| 8,340,685 B2 | 12/2012 | Cochran et al. |
| 8,472,728 B1 | 6/2013 | Chau et al. |
| 8,473,346 B2 | 6/2013 | Mattern et al. |
| 8,554,683 B2 | 10/2013 | Knapp et al. |
| 8,831,987 B2 | 9/2014 | Knapp et al. |
| 8,849,931 B2 | 9/2014 | Linner et al. |
| 9,036,808 B2 | 5/2015 | Kelley et al. |
| 9,076,151 B2 | 7/2015 | Patton |
| 9,135,655 B2 | 9/2015 | Buchalter et al. |
| 9,202,248 B2 | 12/2015 | Bi et al. |
| 9,208,507 B2 | 12/2015 | Mattern et al. |
| 9,832,128 B1 | 11/2017 | Ashner et al. |
| 2002/0029186 A1 | 3/2002 | Roth et al. |
| 2002/0107787 A1 | 8/2002 | Mashinsky et al. |
| 2002/0143901 A1 | 10/2002 | Lupo et al. |
| 2002/0161680 A1 | 10/2002 | Tarnoff |
| 2002/0165849 A1 | 11/2002 | Singh et al. |
| 2002/0169760 A1 | 11/2002 | Cheung et al. |
| 2003/0033292 A1 | 2/2003 | Meisel et al. |
| 2003/0055729 A1 | 3/2003 | Bezos et al. |
| 2003/0135460 A1 | 7/2003 | Talegon |
| 2003/0162329 A1 | 8/2003 | Lucas et al. |
| 2003/0195837 A1 | 10/2003 | Kostic et al. |
| 2003/0212762 A1 | 11/2003 | Barnes et al. |
| 2003/0220866 A1 | 11/2003 | Pisaris-Henderson et al. |
| 2004/0039733 A1 | 2/2004 | Soulanille |
| 2004/0044571 A1 | 3/2004 | Bronnimann et al. |
| 2004/0054589 A1 | 3/2004 | Nicholas et al. |
| 2004/0073482 A1 | 4/2004 | Wiggins et al. |
| 2004/0103024 A1 | 5/2004 | Patel et al. |
| 2004/0111319 A1 | 6/2004 | Matsumoto et al. |
| 2004/0117213 A1 | 6/2004 | Pache et al. |
| 2004/0133469 A1 | 7/2004 | Chang |
| 2004/0148222 A1 | 7/2004 | Sabella et al. |
| 2004/0199397 A1 | 10/2004 | Dresden |
| 2004/0249709 A1 | 12/2004 | Donovan et al. |
| 2004/0267612 A1 | 12/2004 | Veach |
| 2004/0267878 A1 | 12/2004 | Osias |
| 2005/0021440 A1 | 1/2005 | Dresden |
| 2005/0027594 A1 | 2/2005 | Yasnovsky et al. |
| 2005/0033682 A1 | 2/2005 | Levy et al. |
| 2005/0038900 A1 | 2/2005 | Krassner et al. |
| 2005/0055271 A1 | 3/2005 | Axe et al. |
| 2005/0137939 A1 | 6/2005 | Calabria et al. |
| 2005/0144064 A1 | 6/2005 | Calabria et al. |
| 2005/0216335 A1 | 9/2005 | Fikes et al. |
| 2005/0228736 A1 | 10/2005 | Norman et al. |
| 2005/0228746 A1 | 10/2005 | McHale et al. |
| 2005/0255702 A1 | 11/2005 | Honeycutt et al. |
| 2005/0267798 A1 | 12/2005 | Panara |
| 2005/0267805 A1 | 12/2005 | Tarantino |
| 2006/0026067 A1 | 2/2006 | Nicholas et al. |
| 2006/0047579 A1 | 3/2006 | Dresden |
| 2006/0074752 A1 | 4/2006 | Newmark |
| 2006/0095281 A1 | 5/2006 | Chickering et al. |
| 2006/0095336 A1 | 5/2006 | Heckerman et al. |
| 2006/0106709 A1 | 5/2006 | Chickering et al. |
| 2006/0106710 A1 | 5/2006 | Meek et al. |
| 2006/0122907 A1 | 6/2006 | Gould |
| 2006/0129453 A1 | 6/2006 | Gardner et al. |
| 2006/0155597 A1 | 7/2006 | Gleason |
| 2006/0178900 A1 | 8/2006 | Shilo et al. |
| 2006/0184417 A1 | 8/2006 | Linden et al. |
| 2006/0190333 A1 | 8/2006 | Choi |
| 2006/0190385 A1 | 8/2006 | Dresden |
| 2006/0200445 A1 | 9/2006 | Chen et al. |
| 2006/0212350 A1 | 9/2006 | Ellis et al. |
| 2006/0212351 A1 | 9/2006 | Funahashi |
| 2006/0224447 A1 | 10/2006 | Koningstein |
| 2006/0224496 A1 | 10/2006 | Sandholm et al. |
| 2006/0230029 A1 | 10/2006 | Yan |
| 2006/0253578 A1 | 11/2006 | Dixon et al. |
| 2006/0271426 A1 | 11/2006 | Borgs et al. |
| 2006/0271429 A1 | 11/2006 | Borgs et al. |
| 2006/0282328 A1 | 12/2006 | Gerace et al. |
| 2006/0287913 A1 | 12/2006 | Baluja |
| 2006/0287916 A1 | 12/2006 | Starr et al. |
| 2007/0027768 A1 | 2/2007 | Collins et al. |
| 2007/0038516 A1 | 2/2007 | Apple et al. |
| 2007/0055577 A1 | 3/2007 | Ashton |
| 2007/0067267 A1 | 3/2007 | Ives |
| 2007/0087756 A1 | 4/2007 | Hoffberg |
| 2007/0121848 A1 | 5/2007 | Faber et al. |
| 2007/0130009 A1 | 6/2007 | Steelberg et al. |
| 2007/0174118 A1 | 7/2007 | Dekel et al. |
| 2007/0174230 A1 | 7/2007 | Martin |
| 2007/0192194 A1 | 8/2007 | O'Donnell et al. |
| 2007/0192356 A1 | 8/2007 | O'Kelley |
| 2007/0208630 A1 | 9/2007 | Chatter et al. |
| 2007/0239532 A1 | 10/2007 | Benson et al. |
| 2007/0250301 A1 | 10/2007 | Vaisberg et al. |
| 2007/0260514 A1 | 11/2007 | Burdick et al. |
| 2007/0261112 A1 | 11/2007 | Todd et al. |
| 2008/0040225 A1 | 2/2008 | Roker |
| 2008/0040302 A1 | 2/2008 | Perrizo |
| 2008/0046924 A1 | 2/2008 | Hood |
| 2008/0052195 A1 | 2/2008 | Roth et al. |
| 2008/0140508 A1 | 6/2008 | Anand et al. |
| 2008/0162329 A1 | 7/2008 | Knapp et al. |
| 2008/0195458 A1 | 8/2008 | Anschutz et al. |
| 2008/0215290 A1 | 9/2008 | Zweben et al. |
| 2008/0228746 A1 | 9/2008 | Markus et al. |
| 2008/0270359 A1 | 10/2008 | Madhavan et al. |
| 2008/0281983 A1 | 11/2008 | Cooley et al. |
| 2009/0006192 A1 | 1/2009 | Martinez et al. |
| 2009/0006375 A1 | 1/2009 | Lax et al. |
| 2009/0012903 A1 | 1/2009 | Subramanian et al. |
| 2009/0018907 A1 | 1/2009 | McCarthy et al. |
| 2009/0037277 A1 | 2/2009 | Zuckerberg et al. |
| 2009/0043648 A1 | 2/2009 | Mahdian et al. |
| 2009/0055267 A1 | 2/2009 | Roker |
| 2009/0083190 A1 | 3/2009 | Isshiki et al. |
| 2009/0234713 A1 | 9/2009 | Bi et al. |
| 2009/0327029 A1 | 12/2009 | Collins |
| 2009/0327084 A1 | 12/2009 | Patton |
| 2010/0057556 A1 | 3/2010 | Rousso et al. |
| 2010/0082423 A1 | 4/2010 | Nag et al. |
| 2010/0082439 A9 | 4/2010 | Patel et al. |
| 2010/0082472 A1 | 4/2010 | Cheung |
| 2010/0098236 A1 | 4/2010 | Pearson |
| 2010/0106715 A1 | 4/2010 | Byun et al. |
| 2010/0145809 A1 | 6/2010 | Knapp et al. |
| 2010/0191600 A1 | 7/2010 | Sideman |
| 2011/0035277 A1 | 2/2011 | Kodialam et al. |
| 2011/0225608 A1 | 9/2011 | Lopatecki et al. |
| 2011/0258049 A1 | 10/2011 | Ramer et al. |
| 2011/0282730 A1 | 11/2011 | Tarmas |
| 2011/0320259 A1 | 12/2011 | Roumeliotis et al. |
| 2012/0047011 A1 | 2/2012 | Rippetoe et al. |
| 2012/0209710 A1 | 8/2012 | Ramer et al. |
| 2012/0239508 A1 | 9/2012 | DeAngelis |
| 2013/0046636 A1 | 2/2013 | Asnake |
| 2013/0282476 A1 | 10/2013 | Peterson et al. |
| 2013/0282478 A1 | 10/2013 | Mattern et al. |

(56) References Cited

U.S. PATENT DOCUMENTS

| | | |
|---|---|---|
| 2013/0297317 A1 | 11/2013 | Lee et al. |
| 2013/0311296 A1 | 11/2013 | Watfa et al. |
| 2014/0019253 A1 | 1/2014 | Ricasata |
| 2014/0032306 A1 | 1/2014 | Sukornyk et al. |
| 2014/0136312 A1 | 5/2014 | Saksena et al. |
| 2014/0172573 A1 | 6/2014 | Saurabh |
| 2014/0181715 A1 | 6/2014 | Axelrod et al. |
| 2014/0279053 A1 | 9/2014 | Lee |
| 2014/0307968 A1 | 10/2014 | Chattopadhyay |
| 2014/0351059 A1 | 11/2014 | Massoudi |
| 2014/0365297 A1 | 12/2014 | Durvasula et al. |
| 2014/0365298 A1 | 12/2014 | Tang et al. |
| 2015/0006300 A1 | 1/2015 | Hummel |
| 2015/0095166 A1 | 4/2015 | Sweeney |
| 2015/0120468 A1 | 4/2015 | Knapp et al. |
| 2015/0148005 A1 | 5/2015 | Chau et al. |
| 2015/0236738 A1 | 8/2015 | Kan et al. |
| 2015/0248697 A1 | 9/2015 | Mahadevan et al. |
| 2015/0269590 A1 | 9/2015 | Patton et al. |
| 2015/0269610 A1 | 9/2015 | Bi et al. |
| 2015/0278867 A1 | 10/2015 | Lerman et al. |
| 2015/0287072 A1 | 10/2015 | Golden et al. |
| 2015/0302462 A1 | 10/2015 | Yuck et al. |
| 2015/0332331 A1 | 11/2015 | Sura et al. |
| 2015/0348093 A1 | 12/2015 | Jiang et al. |
| 2016/0104208 A1 | 4/2016 | Keiser et al. |
| 2016/0196587 A1* | 7/2016 | Eder .................. G06Q 30/0276 705/14.49 |
| 2017/0024778 A1 | 1/2017 | Knapp et al. |
| 2017/0213255 A1 | 7/2017 | Mysore et al. |
| 2017/0358011 A1 | 12/2017 | Guermas et al. |
| 2018/0040032 A1 | 2/2018 | Chalsani et al. |
| 2018/0189866 A1* | 7/2018 | Dhondse ................. G06Q 30/08 |
| 2018/0300766 A1 | 10/2018 | Ashner et al. |
| 2018/0336590 A1 | 11/2018 | Schobieri et al. |
| 2019/0043081 A1* | 2/2019 | Subramanya ...... G06Q 30/0246 |
| 2019/0043092 A1 | 2/2019 | Zacharski et al. |
| 2019/0130460 A1 | 5/2019 | Theodore |
| 2019/0139079 A1 | 5/2019 | Nataf |
| 2019/0172082 A1 | 6/2019 | Ganti Mahapatruni et al. |
| 2020/0288215 A1* | 9/2020 | Ray .................. H04N 21/25883 |
| 2020/0334320 A1* | 10/2020 | Catlin ................ G06Q 30/0277 |

FOREIGN PATENT DOCUMENTS

| | | |
|---|---|---|
| WO | 2000033163 A2 | 6/2000 |
| WO | 2000041105 A3 | 3/2001 |
| WO | 2001043027 A1 | 6/2001 |
| WO | 2000058897 A1 | 6/2002 |
| WO | 2003025823 A1 | 3/2003 |
| WO | 2004068299 A3 | 11/2004 |
| WO | 2005116874 A1 | 12/2005 |
| WO | 2006026030 A2 | 3/2006 |
| WO | 2006096768 A2 | 9/2006 |
| WO | 2006097826 A2 | 9/2006 |
| WO | 2006104845 A1 | 10/2006 |
| WO | 2006127645 A2 | 11/2006 |
| WO | 2007022137 A2 | 2/2007 |
| WO | 2006062760 A3 | 8/2007 |
| WO | 2006104854 A3 | 9/2007 |
| WO | 2006091970 A3 | 11/2007 |
| WO | 2006128104 A3 | 11/2007 |
| WO | 2008077078 A1 | 6/2008 |
| WO | 2008109071 A3 | 11/2008 |
| WO | 2012174650 A1 | 12/2012 |

* cited by examiner

DIGITAL ADVERTISING PLATFORM WITH DEMAND PATH OPTIMIZATION

RELATED APPLICATIONS

This application claims the benefit of the priority of U.S. Provisional Application No. 62/697,976, filed Jul. 13, 2018, which is incorporated herein by reference in its entirety.

FIELD OF THE INVENTION

The present disclosure relates to the field of digital advertising, and more specifically to a platform for optimizing header bidding for delivery of advertising content.

BACKGROUND

Publishers of web content often seek to monetize their content by displaying ads with their web content to visitors. These ads are typically provided by third-party advertisers who pay the publisher for the number of impressions, i.e., the number of times the advertisement is displayed once on the web page. There are several manners in which most sites monetize their traffic. Some publishers and/or sites may either use a single ad agency, or they may hard code the page to use Google's AdSense program to automatically provide ads for the publisher/site. While this system provides some revenue to the publisher, there is no competition for the publisher's impressions, and as a result, the publisher realizes a lower revenue rate than might otherwise be possible.

"Programmatic advertising" refers to software-based buying and selling of online ad spaces across electronic networks, such as advertising networks that use or interface with the Internet. Programmatic advertising enables the automatic purchase of electronic ad inventory that is offered across various advertising networks by digital advertisers in an efficient manner, typically in real-time with inventory offerings. In recent years, the programmatic advertising industry has grown at such a rapid pace that network resources required to handle the real-time bid request/response traffic have become overwhelmed by the traffic, causing network delays, poor computing and network performance, lack of access to suitable ads, inefficient placement of ads, poor use of advertising budgets, poor scalability, and generally poor overall performance. The network resources simply have difficulty handling the traffic that is coming from the RTB (real-time bidding) ad exchanges, and the DSP (demand-side platform) servers are unable to keep up with the increased traffic flow without adding expensive additional capacity, further diminishing the effective performance of the programmatic advertising environment at affordable capacity levels.

RTB ad exchanges already offer trillions of bid requests per month and this volume is only expected to grow. For example, Boston-based DataXu, founder of the Open RTB consortium, previously had seen 40% annual increases in queries, but experienced a 100% increase in 2016, which it attributed to header bidding. MediaMath saw a 20% rise in queries in 2017, with averages fluctuating between 5 million and 6 million queries per second. As a result, the DSP servers are required to evaluate enormous volumes of traffic in search of relevant ad inventory. While the RTB ad exchanges are mostly managing their demand sources without traffic flow tools, the DSPs are burdened with computing cost and scale problems that they cannot solve on their own.

The DSPs may be trying to meet the demands placed on them by increasing the amount of hardware in their data centers, simply "throttling" the bid stream or other pacing techniques, which ultimately leads to an increase in operational costs for DSPs. This may cut down on the amount of inventory seen and lower publisher revenue, allowing a bid to happen quickly enough to complete a transaction, but makes no accommodation for the quality of inventory seen. The programmatic advertising industry exists in an Internet-age environment that demands highly sophisticated capabilities to isolate the website visitor (e.g., ad buyers and ad inventory sellers) from the complexity of the intervening hardware and networking systems, while delivering highly reliable quality of service. However, these rudimentary hardware-centric attempts at solving a multi-faceted problem have significant consequences for the DSPs, digital ad inventory sellers, digital ad buyers, and the programmatic advertising industry as a whole.

Under many existing approaches, publishers manage their yield by daisy chaining sources in a waterfall structure: publishers offer impressions in one sales channel, and if buyers don't bite, they push them down to other, less valuable channels until someone makes a bid. The system works but is highly fractured and inherently inefficient. Publishers say the system leaves money on the table.

Under the waterfall approach, there are four primary metrics: total monetizable impressions at the very top, then passing through the waterfall is visible inventory, passback amount, passback loss, and discrepancy, which results in the final totals of unfilled and actual monetized impressions. The waterfall can be modeled roughly according to Table 1 below, which is based on a total of 100 million monetizable impressions:

TABLE 1

| Demand Source | Bid Volume | Paid | Passback | Passback Loss | Discrepancy | Paid |
|---|---|---|---|---|---|---|
| #1 | 100M | 50.0M | 50.0M | 5M | 0.10M | 49.90M |
| #2 | 45M | 20.0M | 25.0M | 4M | 0.05M | 19.95M |
| #3 | 21M | 10.0M | 11.0M | 2M | 0.05M | 9.95M |
| #4 | 9M | 5.0M | 4.0M | 1M | 0.05M | 4.95M |
| #5 | 3M | 1.0M | 2.0M | | 0.10M | 0.90M |
| | | | | Actual Monetized Impressions: | | 85.65M |
| Unfilled: | 2.00M | | | | | |
| Lost to Passback: | 12.00M | | | | | |
| Discrepancy: | 0.35M | | | | | |
| Paid: | 85.65M | | | | | |

The result is 12M impressions list purely to programmatic inefficiency and a 2.07:1 ratio of bid volume to paid impressions.

An alternative to the waterfall approach, "header bidding", also known as "advance bidding" or "pre-bidding," is an advanced programmatic technique through which publishers offer inventory to multiple ad exchanges simultaneously before making calls to their ad servers (mostly DoubleClick for Publishers (recently rebranded to Ad Manager)). The idea is that by letting multiple demand sources bid on the same inventory at the same time in an auction, publishers are able to increase their programmatic yield and make more money.

The biggest benefit that header bidding offers to publishers is greater yield. However, there are significant downsides to header bidding including: (1) increased responsibility on the publisher to get config correct; (2) increased activity at the page level that effects user experience ("UX") while also increasing publisher complexity; and (3) much greater bid volume to the DSPs and SSPs (supply-side platforms) providing header bidding services.

With header bidding, the situation is notably different. Using the same example as provided for the waterfall, 100 million total monetizable impressions, Table 2 illustrates the benefits of the header bidding approach:

TABLE 2

| Demand Source | Visible | Paid | Passback | Passback Loss | Discrepancy | Paid |
|---|---|---|---|---|---|---|
| #1 | 100M | 49.0M | 0 | 0 | 0.10M | 48.90M |
| #2 | 100M | 19.0M | 0 | 0 | 0.05M | 18.95M |
| #3 | 100M | 13.0M | 0 | 0 | 0.05M | 12.95M |
| #4 | 100M | 6.0M | 0 | 0 | 0.05M | 5.95M |
| #5 | 100M | 2.5M | 0 | 0 | 0.10M | 2.40M |
| | | | | | Actual Monetized Impressions: | 89.15M |
| Unfilled: | 10.50M | | | | | |
| Lost To Passbacks: | 0M | | | | | |
| Discrepancy: | 0.35M | | | | | |
| Paid: | 89.15M | | | | | |

Monetization, for the publisher, is better without the notable passback loss. In addition, the supply is spread across more demand sources because their bids were available on supply that wasn't previously visible to them. This increased visibility leads to more total impressions bought and at a higher monetary amount.

Comparing the approaches side-by-side, four out of five demand sources experience a major improvement using a header bidding technique. While header bidding provides improvement in visibility, bid density and discrepancy at the same time passback loss is removed, the technology is not without its downsides. An important consideration is that these additional bids represent notably increased costs through the entire demand source ecosystem. The current solutions in the space deal with decreasing bid volume once it is inside the demand sources network. The following describes some of the key header bidding challenges.

The result of nearly all of the header bidding issues is what may be termed "Overbid," which is the instance where a bid is requested from the ad server that will never be displayed. In our experience, as many as 25% of all bids in the header bidding space are some form of overbid.

The ad server, such as Ad Manager, is at the center of the Overbid interaction when there is a mismatch when ad units are requested from the header bidder but the related ad unit is never actually considered by the ad server. This misalignment is the ultimate source of Overbid.

Site UX considerations include that work in the browser means more work on the client machine. There is considerable inconsistency in the quality of bandwidth and machines in the global population of web users. In addition, new aspects of header bidding, such as concurrent bid configuration, can lead to poor performance. This has both a device and UX impact.

There can be a great deal of variance in ad layouts depending on different client devices. This issue can be exacerbated dramatically when responsive layouts are included in the ad. In addition to device variances there are a great deal of layouts each demanding their own config. One of the primary challenges in header bidding optimization is how to approach exploration of the optimization space. Consider the following example:

1. 3 Page Variations
   a. 4 possible ad placements
   b. 4 ad sizes
2. 100 geographies
3. 20 Bidders
4. 0-10,000 Bid Timeout
5. 0-10,000 Page Timeout
6. 1-N Bidder Concurrency
7. 3 major device groups.

One would have a potential optimization space of over 172.8 trillion possibilities. This space is far too large to explore linearly, while also exploiting the naive solutions.

The manual configuration of header bidding participants leads to a "path of least resistance" config. This is the config that provides the most revenue with the least configuration pain, which is sub-optimal, and thus, sub-optimal participants. Instead, the config should be optimized for the aspects of each page request.

The impact of header bidding on the upstream DSP is considerable. Problems include increased bid volume: The Overbid and Sub-optimal participants generate a bid request volume to demand sources that must be processed, responded to, and with a reasonable attempt to monetize.

Not every demand source is able to efficiently handle each request. For example, if one demand source handles European traffic better than another, a system is needed to split the bid config amongst them.

The overall result of the existing approaches is that some demand sources appear to perform poorly for reasons that, in many cases, are simply not under their control. To summarize the problem to be solved, the proper header bidding config is not 5 Bidders for all Traffic, but 15 Targeted Demand Sources that kick in for different user/site/time or other criteria.

The current approaches to handling the challenges to effective header bidding leave much to be desired. In some cases, DSPs are utilizing supply path optimization to simply deny bids, or they are essentially throttling some sources of traffic at the client or URL level. In other cases, DSPs are also choosing to be more selective about which sites to allow into their supply since bid efficiency and ROI are so impacted by sub-optimal config. In addition, latency is not a static consideration. More is not necessarily worse and less is not necessarily better. The proper conception of latency is as an input into a revenue optimization function. This, in simple terms, is a classic optimization problem.

In an exemplary advertising exchange implementation, a website visitor or client on a network-accessible client device may access content supplied by a publisher. To maintain a positive user experience for the content, a publisher may require response from potential advertisers, ad agencies, and/or ad exchanges within a specified time threshold. In many cases, network latency may account for a significant proportion of the time spent handling a given request. Another significant source of latency may be the time a downstream actor, e.g., an advertiser seeking to advertise through an ad exchange, takes to respond to a request. Some sources of latency may typically be outside of the control of a given actor. Thus, it may be necessary to establish a balance between how many advertisers each ad impression is shopped to by a publisher and the resulting latency from waiting for responses from each advertising partner.

Header bidding solutions have been proposed by a number of players in the field. US Patent Publication 2019/0130460 of Theodore describes an approach to increase website advertising revenue while maintaining low latency based on header bidding, but is focused on organizing multiple wrappers, which is sub-optimal. US Patent Publication 2019/0043092 of Zacharski, et al. (Engine Media, LLC) employs a daisy chain of configurations that remove earlier winners. This appears to have the goal of spreading wins around without increasing bid volume massively. This approach deals with configurations that feed into one another sequentially, which is also sub-optimal.

An additional result of misconfiguration in header bidding is reduction in perceived value. Often, the efficiency observation at the DSP is not very granular. A naive bid versus revenue or fill rate calculation may be the top line business value metric. If a site is sending many bids, but monetizing few of them, they will be seen as a lesser valued part of the supply pool.

In view of the aforementioned problems with existing approaches to digital advertising, a need remains for an improved ability to route only relevant and usable data traffic over already crowded networks towards SSP servers to eliminate wasted computing, networking, and latency issues so they can put their focus on innovation and monetization of inventory.

"Supply-path optimization (SPO) refers to the ways that advertisers optimize the path to the advertising inventory they want. Buyers are selecting fewer places from which to buy, with fewer URLs and publishers. While these decisions are based largely on cost, they are also driven by a desire for transparency and safe, high-quality media. This is one way that buyers and sellers are moving closer together in their thinking and strategic planning, while reducing the number of middlemen in any given transaction.

Publishers are effectively following the same process from their corner of the industry and working in the opposite direction. Via demand-path optimization (DPO), publishers are optimizing the path from supply-side platforms (SSPs), exchanges and ad networks to trade desks, demand-side platforms (DSPs) and brands that have taken their buying in-house.

Supply Path Optimization (SPO) optimizes the publisher supply to the buyer. Demand Path Optimization (DPO) is the mirror image of SPO, optimizing demand supply to the seller. Both seek to remove unwanted inventory, or less desirable inventory, from advertising channels, while improving the impact of each dollar spend. Important distinctions are that SPO focuses on achieving the lower cost results from the supply, while DPO is focused on receiving the highest price from demand.

BRIEF SUMMARY

According to the inventive platform, Demand Path Optimization (DPO) and Supply Path Optimization (SPO) are combined to benefit both publisher and buyers. In one embodiment, the inventive approach is effective in optimizing a path across programmatic advertising landscape. This new approach meets in the middle, between DPO and SPO, with advertisers and publishers working more or less directly, using exchanges and SSPs for pure utility.

Demand sources consider "sites" as supply. Publishers consider networks and SSP's/DSP's as "demand." The inventive solution described herein, referred to as the "PubWise system," is a complex Demand Path Optimization (DPO) system that takes into account an array of key parameters while optimizing for revenue capture by working on both sides of the supply chain and also allowing Demand Source business rules to be pushed to the computing edge at the browser resulting in a publisher focused Supply Path Optimization. The PubWise system manages the entirety of header bidding technology for any website(s). Publishers can eliminate long setup times and maximize their current strategies by using the PubWise approach, which include instant configuration, discrepancy tracking, transparent across-the-board analytics, essential reporting, demand source management, and an alternative to the revenue limitations associated with the programmatic waterfall structure. PubWise can be used along with a publisher's existing ad setup, so no updates are required to demand sources or direct campaigns. The header technology only operates when a bid beats existing advertising. Using this approach, the PubWise system interacts with publishers to ensure they are no longer offering inventory to a demand source where the likelihood of strong bidding is low. In an exemplary embodiment, a plurality of key variables are evaluated in an algorithm for optimizing the bidding. The system uses machine learning, e.g., a multi-armed bandit approach, with a continuous reinforcement learning process driving the exploration phase.

One of the primary challenges in header bidding optimization is how to approach exploration of the optimization space. The enormous number of potential permutations makes it impractical if not impossible, to explore linearly. Traditionally, all ad servers have relied on human intervention for testing and yield management. The ability provided by the inventive approach to directly insert machine learning into the ad server and the header bidding config renders existing systems obsolete.

The PubWise approach employs a combination of thresholds and weighting that observes the data stream to optimize on the demand side through a combination of pruning, consolidation and machine learning. With pruning, the PubWise system is able to pinpoint audience that matches long tail demand and use a given demand source when appropriate. This often occurs with international demand. This is fundamentally different than supply-side pruning. Demand-side pruning results in a reduction of publisher fill rate, while DPO improves it. Using the weighting approach, a baseline configuration is arranged. The platform's optimization module then analyzes variations of that config to determine the optimal setup across all possible combinations. This allows the platform to intuitively identify demand that matches different audiences. Since it is not based on long optimization time or human-driven update cycles, the machine learning process allows the system to be constantly updated.

The inventive approach reduces the test/update cycle from months to weeks to days, possibly even hours. Whether there is a small set of combinations to analyze or hundreds of thousands, the weighting approach can dramatically reduce the workload by efficiently reducing human hours spent testing and optimizing while minimizing error.

In one aspect of the invention, digital advertising system includes at least one processor configured to execute a plurality of functional modules comprising: an analytics module configured to receive and analyze client attributes associated with a website visitor and a requested website to define an analytics event therefrom, wherein the analytics module further operates to ingest and enrich data within the analytics event; a machine learning module configured to receive an enriched analytics event and generate prediction models based on the enriched analytics event; a management platform comprising a configuration module for receiving the bidding prediction and generating one or more candidate configs based upon the bidding prediction and pre-selected features of an advertisement, an optimization module configured for receiving the one or more candidate configs and applying weights and additional features to select a config from the one or more candidate configs and generate optimized scripts using the selected config; and a deployment module configured for receiving the optimized scripts and deliver a selected script of the optimized scripts to the website visitor. In some embodiments, the management platform further comprises a visualization module including a user interface for monitoring and control by a human administrator. The user interface may include selection screens for entering bidding preferences and ad characteristics.

The machine learning module generates prediction models using one or more machine learning algorithms selected from the group consisting of multi-armed bandits, naïve Bayes classifiers, decision trees, expert systems, genetic algorithms, graph analytics, linear regression, logistic regression, Markov chain Monte Carlo methods, neural networks, random forests, and support vector machines. In an embodiment of the platform, the machine learning module generates prediction models using a multi-armed bandit (MAB) exploration and exploitation algorithm, wherein arms of the MAB represent ad options. These ad options may comprise ad delivery and ad placement. In other embodiments, the machine learning module generates predictions models using a combination of Bayesian inference and a kriging algorithm.

The weights applied by the optimization module are determined by machine learning, or they may be pre-determined within the management platform according to a website publisher's preference. In some embodiments, the pre-determined weights may be determined by site-specific thresholds. In other embodiments, the one or more candidate configs are at least partially generated using settings entered by a human administrator via the management platform. The optimization module may select the selected config according to a plurality of features selected from page variations, number of bidders, number of geographies, bid timeout, page timeout, bidder concurrency and client device type.

In another aspect of the invention, a method for digital advertising includes storing non-transitory machine readable code in at least one processor causing the at least one processor to configured to execute a plurality of functional modules including: an analytics module configured to receive and analyze client attributes associated with a website visitor and a requested website to define an analytics event therefrom, wherein the analytics module further operates to ingest and enrich data within the analytics event; a machine learning module configured to receive an enriched analytics event and generate prediction models based on the enriched analytics event; a management platform comprising a configuration module for receiving the bidding prediction and generating one or more candidate configs based upon the bidding prediction and pre-selected features of an advertisement; an optimization module configured for receiving the one or more candidate configs and applying weights and additional features to select a config from the one or more candidate configs and generate optimized scripts using the selected config; and a deployment module configured for receiving the optimized scripts and deliver a selected script of the optimized scripts to the website visitor. The management platform may further include a visualization module with a user interface for monitoring and control by a human administrator. The machine learning module may generate prediction models using one or more machine learning algorithms selected from the group consisting of multi-armed bandits, naïve Bayes classifiers, decision trees, expert systems, genetic algorithms, graph analytics, linear regression, logistic regression, Markov chain Monte Carlo methods, neural networks, random forests, and support vector machines. In one embodiment, the machine learning module generates prediction models using a multi-armed bandit (MAB) exploration and exploitation algorithm, wherein arms of the MAB represent ad options. In another embodiment, the machine learning module generates predictions models using a combination of Bayesian inference and a kriging algorithm.

The weights applied by the optimization module may be determined by machine learning, they may be pre-determined within the management platform according to a website publisher's preference, or they may be determined by site-specific thresholds.

The PubWise approach gives publishers the ability to manage a large number of demand sources. It can reduce bid volume by as much as 40% while reducing page latency, increasing ad viewability and improving the user experience. Since the inventive scheme is able to target demand to various audiences, the gross number of demand sources active on any site can be expanded. This increases competition and pushes up revenue in header bidding.

At the same time publishers expand their market, demand sources benefit from the PubWise approach by reducing data infrastructure costs by the same volume. This ensures that their bids are not being wasted on misconfigurations.

In an embodiment of the inventive PubWise approach, the configuration is grouped into two "exploration regions": Ad Delivery and Page Configuration. These two regions include the following parameters: 1) Ad Delivery: page variations, e.g., ad placements and ad sizes, and bidder; and 2) Page Configuration: bid timeout, page timeout, and bidder concurrency. As will be apparent to those in the art, additional parameters relevant to these regions may be included. In all cases, the following additional parameters may be used for optimization: geography, internet speed, device, and site. The weights module employs machine learning to select and weight the various parameters to optimize inventory, increase competition, and increase revenue.

The inventive system permits exploration of one aspect while exploiting an area where various optimal settings can be found. For example, one bidder may provide very different performance relative to another, while a trend towards ad size and position is likely to be market wide. In addition, timeout configurations are likely to have similar effects on all bidders.

DETAILED DESCRIPTION OF EMBODIMENTS OF THE INVENTION

Figure 1A:
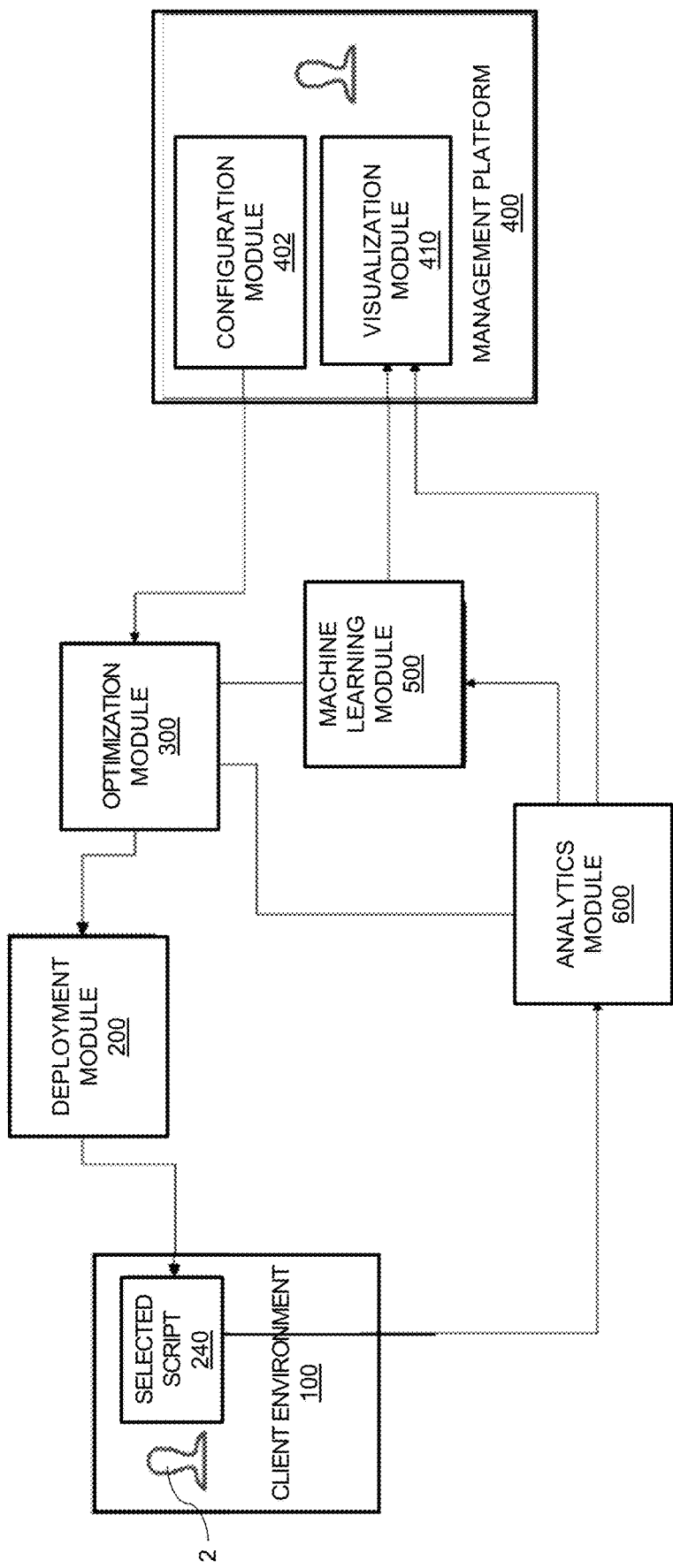
FIG. 1A is a high-level diagram of an advertising platform according to an embodiment of the invention.

The description herein employs a large number of terms and acronyms that are commonly used in the software, networking and/or advertising fields. For the reviewer's convenience, Table 3 provides a list of the acronyms and their common meanings in the industry.

TABLE 3

| ACRONYM | DEFINITION |
| --- | --- |
| UX | User experience |
| SSP | Supply side platform |
| DSP | Demand side platform |
| RTB | Real-time bidding |
| SaaS | Software as a service |
| DPO | Demand Path Optimization |
| SPO | Supply Path Optimization |
| URL | Uniform Resource Locator |
| CDN | Content Delivery Network |
| ML | Machine Learning |
| API | Application Programming Interface |
| MAB | Multi-armed bandit |

The following is a glossary of terms that may assist the reader in understanding of the disclosure:

"Ad Exchange" means marketplaces that conduct auctions between publishers selling ads and advertisers looking to buy ads. These auctions are usually real-time.

"Ad Impression" or simply "Impression" means the number of times an ad has been served, regardless of whether the user (client) has actually seen or interacted with the ad in any way.

"Ad Inventory" means the number of potential ads that can be served by a publisher to visitors ("Site Visitors") when they visit a web page.

"Ad Targeting" means delivering ads to a pre-selected audience based on various attributes, such as geography, demographics, psychographics, web browsing behavior and past purchases.

"Ad Unit" means a size-and-format specification for an ad. The Interactive Advertising Bureau, a trade association promoting digital ad standard and practices, has a set of guidelines for sizes.

"Advertiser" means a person or entity looking to buy ad inventory from publishers. Also known as: "buy side" or "demand side."

"Bidder" means the buyer of inventory on ad exchanges. This term can also be used more broadly to mean any system or entity that is participating in an auction for supply.

"Demand source" is anybody who brings advertiser demand to ad inventory (supply) that exists in the industry. Supply may be a server side platform (SSP) or a publisher directly who has games or apps that have advertising space (the inventory) and is ready to offer it to advertisers for a fee.

"Demand-Side Platform" or "DSP" means a system that allows advertisers to bid for and purchase inventory from multiple ad exchanges, through one single interface.

"Fill Rate" means the number of ads that were delivered to a client (an impression) compared to the number of times an ad was requested from an ad source.

"Floor price" means the minimum amount a publisher is willing to accept to serve an ad.

"Frequency" means the number of times an ad is served to the same consumer during a specific time period.

"Geographic Targeting" means selecting an audience for a campaign based on zip codes, designated marketing area (DMA), cities, states and countries.

"Header Bidding" refers to a process that enables advertisers to compete for publishers' reserved and unreserved inventory via an auction that takes place outside of the ad server.

"Programmatic Media Buying" refers to an automated method of buying media which ensures that advertisers are reaching the right person, at the right time, in the right place. The ads are bought based on a set of parameters predefined by the company placing the ads. Programmatic advertising uses data to make decisions about which ads to buy in real time, which improves efficiency and increases the effectiveness of the ads.

"Publisher" means a site or an application with ad space for sale, also known as "sell side" or "supply side."

"Reach" means the total number of people who see an ad. One person who is served an ad five times and clicks on it once yields a reach of 1, 5 impressions, and a clickthrough rate of 20%.

"Real-time Bidding" or "RTB" refers to the process of buying and selling online ad impressions via an auction with the goal of allowing advertisers to show specific ads to a target audience.

"Supply" refers to the inventory that a publisher has available to monetize. Demand sources bring buyers to that supply.

"View Through" is a measure of consumer behavior after they have been served an ad. If the view through window is set to 90 days, relevant actions made by the consumer within that time period can be attributed to the ad.

"Yield" means the revenue a publisher receives through money spent by an advertiser or ad exchange for ad space and how many clicks they receive on a served ad.

RTB ad serving, through which advertisers place bids on impressions and almost instantly have their ads shown on publisher websites, is known in the art. To provide a high-level overview of RTB, when a browser being used by a client (website visitor) navigates to a publisher website, the publisher's web server sends back HTML code that tells the browser where to access the desired content and how to format it. Part of the HTML code returned to the browser will include a coded link known as an "ad tag." The publisher's Ad Server will return a tag that points to an RTB-enabled SSP, typically through a dynamic Javascript tag that passes information such as the publisher's ID, the site ID, and ad slot dimensions.

From there, the client, also referred to as the "website visitor", calls the SSP server where the SSP reads that client's SSP cookie ID, which is likely already on their machine. Assuming the client already has that SSP's cookie on their machine, the SSP starts the auction by requesting bids from a host of demand sources, the DSPs. If the client does not have an SSP cookie on their machine, their ad inventory can technically still be auctioned, but since nothing is known about that client, the price will tend to be low and more related to the site context than to the client's attributes. For the DSPs to truly value the impression, they need to know something about who is going to see it. This is where the SSP cookie ID comes in—packaged with the bid request is the SSP's cookie ID, along with the URL the impression will deliver on, and what the current client's frequency is on that site. Rich data is the primary driver of higher bids, and the cookie ID is the mechanism through which data is associated to a client.

Beyond the information about the client, where the ad will appear, e.g., the URL, is also important. For example, advertisers are willing to pay a premium to reach website visitors on their first or second pageview on a site vs. their 50th page view for the simple fact that website visitors are less engaged with site content and more likely to respond to an ad during their first few page views.

Based on the website visitor (client) ID and URL, the DSPs value that impression and submit a bid back to the SSP as well as an ad redirect to send to the client should their bid win the auction. The SSP picks the winning bid and passes the DSP's redirect back to the client. From here the client calls the DSP, the DSP sends the client the marketer's ad server redirect, and client calls the marketer's ad server and the marketer serves the client the final ad.

The following description refers to "modules" and "engines", sometimes interchangeably, to refer to various functional blocks within which one or more operations are performed or executed in conjunction with the inventive platform. The use of the terms in the alternative is not intended to suggest that they are distinct elements. Furthermore, this description uses the terms "configuration" and "config" interchangeably to refer to the same object, which is the FIG. 1A provides a high-level diagram of the major modules within the inventive advertising platform. Referring first to Management Platform 400, this is where an administrator or other advertising manager accesses and utilizes a Visualization Module 410 and the Configuration Module 402 to make decisions about how to configure the "model", or the "Candidate Config" that is stored in Configuration Module 402. The Candidate Config is used by the Optimization Module 300 as the baseline for which attributes and features are in play for optimization. The Optimization Module 300 makes requests from the Machine Learning (ML) Module 500 to determine, based on a machine learning algorithm, which elements or "Ad Units" or other configuration options to use, as well as direct calls into the Analytics Module 600 to find more traditional machine optimizations, for example, thresholds or similar relatively simple decision making criterion. In one approach, the decision-making criterion could be an optimal time-out, for example, a calculation over the last 30 days where 90% of revenue is captured within a certain timeframe, which can be used to automatically adjust as a time-out. Optimization Module 300 creates both unoptimized and optimized configurations, the latter of which can be referred to as "exploration configs". In some embodiments of the inventive platform, the exploration configs may correspond to an arm or lever of a multi-armed bandit (MAB), which is part of one of the possible machine learning approaches that may be used, which is further described with reference to FIGS. 10 and 12. In this case, each exploration config is a potential improvement, so the system continuously tries new things and measures the result as it goes through the exploration period, e.g., a day, on hourly updates. In other embodiments, the exploration configs may be selected through linear regression models that can be regularly updated in the ML Module 500 using newly acquired data. In still other embodiments, one or more other machine learning algorithms such as naïve Bayes classifiers, decision trees, expert systems, genetic algorithms, graph analytics, logistic regression, Markov chain Monte Carlo methods, neural networks, random forests, support vector machines, and other algorithms may be used for selection of the appropriate config.

The Deployment Module 200 makes selections of which item from the Optimization Module 300 to deliver to the website visitor or client 2 (via whatever user interface (device) the client may be using). The Deployment Module 200 also makes decisions related to whether to deliver an exploration config or an optimized config. In addition, the Optimization Module sends the metadata necessary for that information from the selected script in Client Environment 100 for the metadata to be sent back to the Analytics Module 600 so that the Optimization Module 300 and Machine Learning Module 500 can properly react to whether an exploration config or other type of config, i.e., an optimized config, was deployed.

Figure 1B:
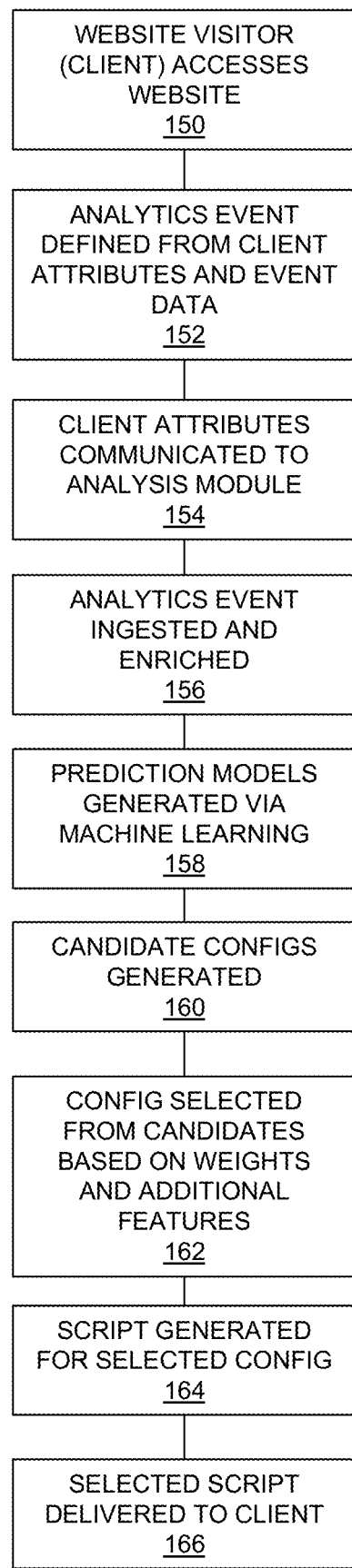
FIG. 1B is a flow diagram of an ad generation sequence within the platform of FIG. 1A.

FIG. 1B is provides a flow diagram showing the high-level interaction among the modules shown in FIG. 1A.

Additional details of the interactions will be described with reference to the individual module elements. The process begins in step 150 with a website visitor, or client in client environment 100, requesting access to a website by clicking on a link to a URL using a device connected to the network via wired or wireless connection. In step 152, an analytics event is defined from the client attributes 110 and other event data (time, URL, etc.) and is communicated to the Analytics Module 600 in step 154, in which the event data are ingested and enriched in step 156. The enriched event data are communicated to the Machine Learning Module 500 which, in step 158, uses a machine learning algorithm to generate bidding prediction models for different ad options. In step 160, the predictions and the enriched event data are input into a configuration module which generates candidate configs based on the predictions, event data and other parameters that may be entered by a system administrator. In step 162, the candidate configs are evaluated based on weighting according to pre-determined thresholds and additional features. After a config is selected, in step 164, a script is generated. The selected script is delivered to the client in step 166.

Figure 2:
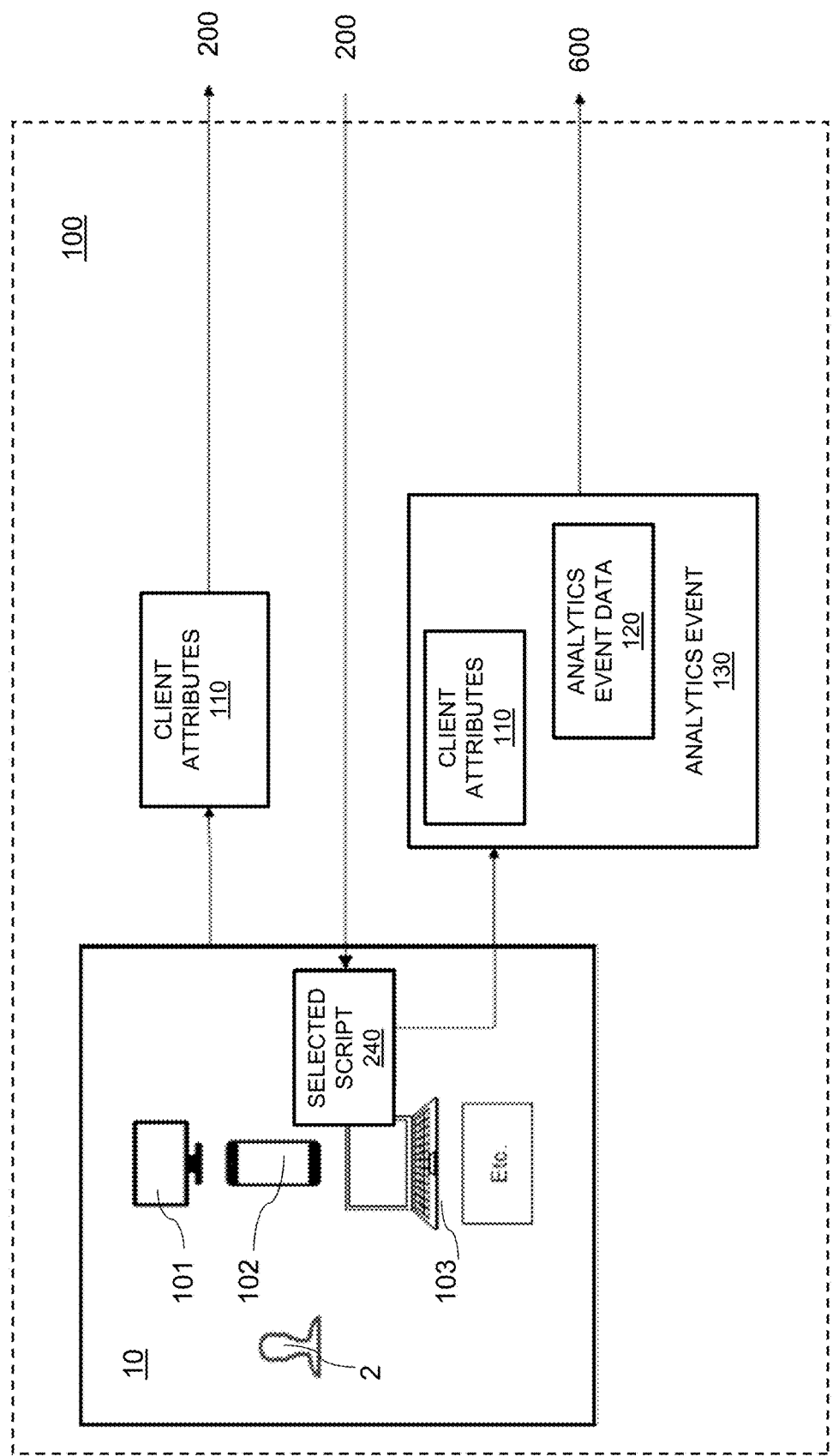
FIG. 2 is a block diagram of an exemplary environment for collecting client data in an embodiment of the inventive advertising platform.

Referring to FIG. 2, in Client Environment 100, the primary focus is on selecting the proper script and then sending analytics events 130 to the Analytics Module 600. Inherently in the http protocol, the browser sends certain client attributes to the Deployment Module 200. These are primarily internet protocol (IP) and device, which are used to pick the specific configuration to deploy. The selected script 240 is deployed by the Deployment Engine 200 into the Client Environment 100 after the Optimization Module 300 has received inputs from each of the Machine Learning Module 500, Management Platform 400 and Analytics Module 600. The Deployment Engine 200 makes other decisions about the exact nature of the selected script 240, along with metadata about the particular config. Regardless of whether it is an exploration config or an optimized config, they are sent as the client attributes 110 along with the analytics event data 120. The analytics event data 120 is specific to header bidding as well as the metadata about the nature of the text that is being run. As a group, these are referred to as an "analytics event" 130, which includes both the client attributes 110 and the analytics event data 120. The data corresponding to the analytics event 130 is sent to the Analytics Module 600.

The client attributes 110 include data collected about the client 2 from various potential sources 10, i.e., devices that are used by the client 2. The system's primary collection API is a JavaScript client 101. This API deploys the optimal config for a given client. A secondary mobile client device 102 may be used. Additional analytics sources may include any data source 103 that communicates data about the client that is in the correct format for collection and processing by Analytics Module 600.

Figure 3:
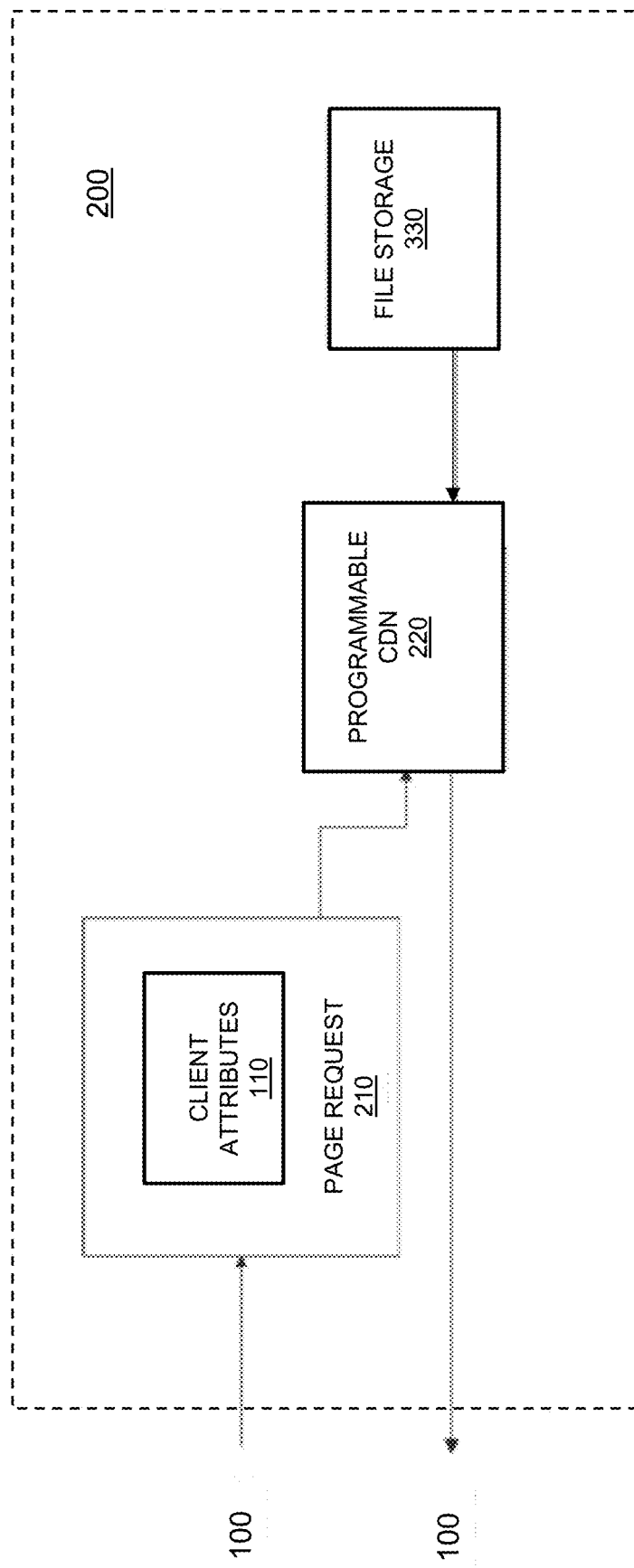
FIG. 3 is a block diagram of a deployment modules for processing client data according to an embodiment of the invention.

Referring to FIG. 3, Deployment Module 200 takes the client attributes 110 from the Client Environment 100. The client attributes 110 are incorporated within a page request 210 that includes a specific URL, where that URL encodes information about the specific site requested by the client as well as the specific target script. A programmable CDN 220 uses information from the page request 210 to align to the file created by the Optimization Module 300. The Optimization Module 300 generates these files by combining the client attributes 110 and the URL in the page request 210 along with other information such as target hour, and similar data, can be used to obtain a file from file storage 330 and then it is sent back into the Client Environment 100. File storage 330 can be any kind of web-available storage, e.g., cloud storage such as AMAZON® S3, GOOGLE® Cloud, RACKSPACE, or other. The CDN 220 translates all the features as they come through to deliver the particular file configuration that is optimized for the features, so the client attributes 110 end up being overlaid into or associated with these features in order to go through the CDN 220. By saving the resulting scripts in storage 330, a record is created for the visitor so that when the visitor, or visitors with matching feature criteria, returns to the site, it is not necessary to make all decisions in real time.

Deployment Module 200 ensures that for each given combination of website and user information, the proper script and ad configuration are delivered to the CDN 220. In some embodiments of the inventive platform, AKAMAI® is used as the CDN provider to ensure that the scripts are delivered quickly and efficiently to the client. Alternative providers include LIMELIGHT®, FASTLY®, CDNETWORKS® and AMAZON® CLOUIDFRONT®. The system should preferably include event logging sufficient for tracking terabytes of data and making real time responses for a percentage of requests.

Performance and scalability are major concerns in this space. In one implementation, a more complex algorithm such as NeuralBandit (see R. Allesiardo, et al., "A Neural Networks Committee for the Contextual Bandit Problem", ICONIP 2014: Neural Information Processing, 2014, pp. 374-381) is facilitated by also including a "feature aware cache layer". Real time model responses generate a configuration script that is cached at a CDN 220 edge for a predetermined amount of time. The cache timer is the "exploit/explore" interval and is configurable in relation to model response time and system stability. Shorter intervals allow more learning, while longer intervals are less impactful on the system. Essentially, each feature in the model is a cachable entry at the CDN edge. This means that even if the ML Module 500 is learning from incoming data, it is not being tasked with new predictions for each cache invalidation cycle. Instead, the response is cached as a valid configuration for some period of time. If the same data comes in, the system responds with the previously optimized config. New data intake is ongoing, and the ML Module 500 is continuously being retrained.

The programmable CDN 220 also performs tasks such as setting ratios of the types of traffic, e.g., it can be programmed to perform exploration and not optimize configs (or minimize optimization), or it can optimize configs and perform little or no exploration. Selection of such ratios is a business decision. A typical deployment would be 10% of traffic unoptimized and 90% optimized. In other words, 10% exploration, 90% optimized.

Figure 4:
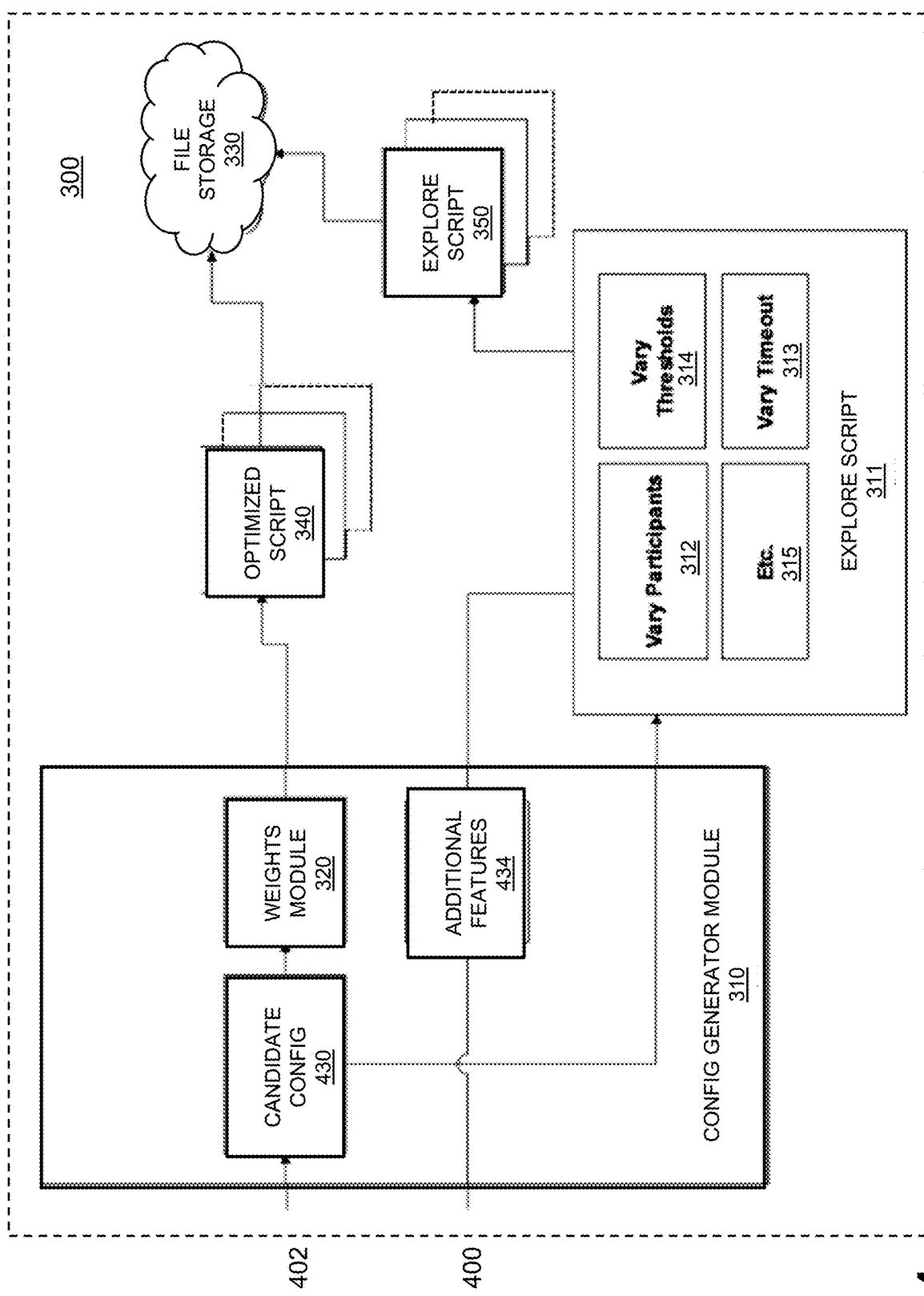
FIG. 4 is a block diagram of an exemplary optimization module according to an embodiment of the invention.

FIG. 4 illustrates the elements of Optimization Module 300. Inputs to the Optimization Module are provided primarily by the Management Platform 400. Config Generator Module 310 receives the candidate config 430 from Configuration Module 402. The candidate config 430 includes the Ad Units plus their bidders as well as any device-specific configuration. The Optimization Module 300 is concerned with generating scripts and delivering them to file storage 330, and to essentially preconfigure the explore scripts 350 as well as the optimized scripts 340. Optimization Module 300 can generate multiple optimized scripts 340 and explore scripts 350 in each path. This is typically scheduled to run hourly, but other frequencies can be selected. The candidate config 430 comes in from Configuration Module 402 and there are two ways it can be used. First, candidate config 430 goes into the explorer script generation module 311 where decisions are made with data from analytics to vary parameters that may include which bidders (vary participants 312) are in play, the time-out 313, thresholds 314, e.g., how many bidders to include, and miscellaneous decision criteria that may be relevant to the platform administrator or users (etc. 315). Each of these parameters is then labeled as a test variant, which is sent as an explorer script 350 to file storage 330. Later, the Deployment Module 200 chooses to deliver it so that the Analytics Module 600 can track the information about it. These candidate configs 430 are also entered into the Weights Module 320. Weights Module 320 makes decisions based on matching to pre-determined models or templates, or from machine learning, to generate an optimized script 340. Regardless of whether matching or machine learning is used, additional features 430 are used. The additional features are information items that are not generated via machine learning, for example, whether time-out is available, whether there is a time-out server-to-server config, and similar relevant considerations. Parameters that can be varied within explore script 311 include whether a particular request is made server-to-server or whether it has been made on the client side only, in addition to the participants 312, the thresholds of how many total bidders 314, and the script's time out 313.

Figure 5:
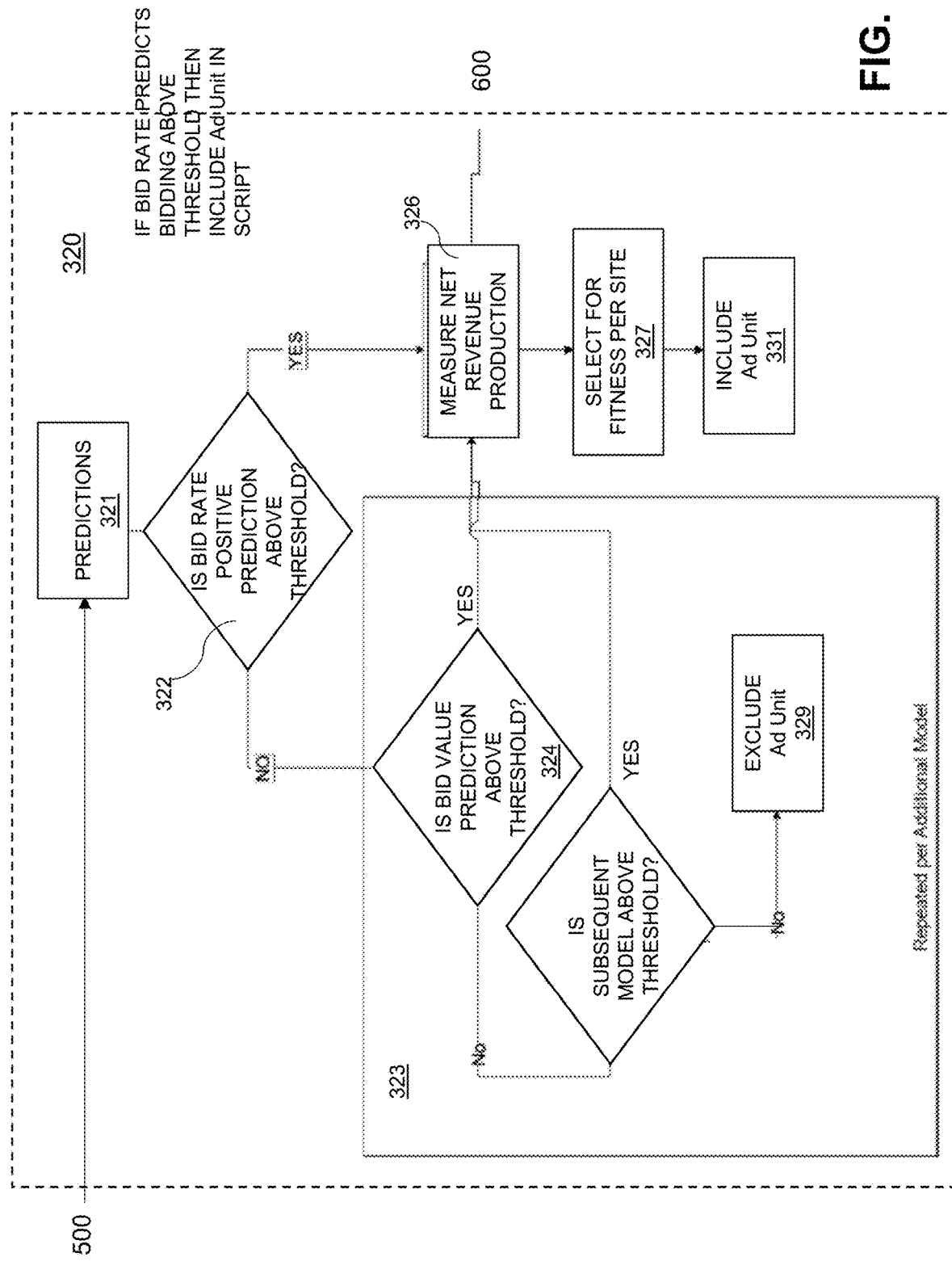
FIG. 5 is a block diagram of an exemplary weighting module according to an embodiment of the invention.

Weights Module 320 is illustrated in FIG. 5. In some embodiments of the inventive platform, predictions 321 may be made from the candidate config 430. These are threshold-based predictions, where the thresholds themselves are model-specific. In the models generated, a threshold is chosen that hits a preferred error of Type 1 and Type 2 errors so that in the bid rate case (step 322), it is preferable to choose a model-specific threshold that tends to limit false negatives. To provide an example, this scenario relates to instances where a bidder says they wouldn't bid, but they would have bid. The inventive platform is set up to deal with this type of false positives, which are indicated instances when the system says they would bid when they don't. This feature is beneficial to encourage as much competition in as possible. The goal here is to reduce bid volume by as much as 40%. In this case, there is a secondary model, and further models, e.g., tertiary and so on, could be developed. The secondary (or further) model 323 first predicts bid value. Thus, even in the case where we may predict that a potential bidder is unlikely to bid, the secondary model looks at it in terms of if they were to bid, what would the price be expected to be, i.e., whether the bid value prediction is above a threshold (step 324). If that threshold is based on a selected percentage of a site average, e.g., 20%, then it should be included anyway so that it can be considered. The exact threshold is site-specific and would generally be selected by the site publisher. If the threshold is not exceeded, the Ad Unit will be excluded (step 329). The end result is that out of the Analytics Module 600, the net revenue production 326 of these configurations is measured, after which the fitness of a particular Ad Unit's configuration for a given site (step 327) is evaluated to determine whether to include the Ad Unit (step 331) in the optimized configuration. If the measured net revenue production 326, which comes out of the Analytics Module 600, meets the appropriate criteria, the Ad Unit is included (step 331) and is output to Optimization Module 300 as the optimized script.

Figure 6:
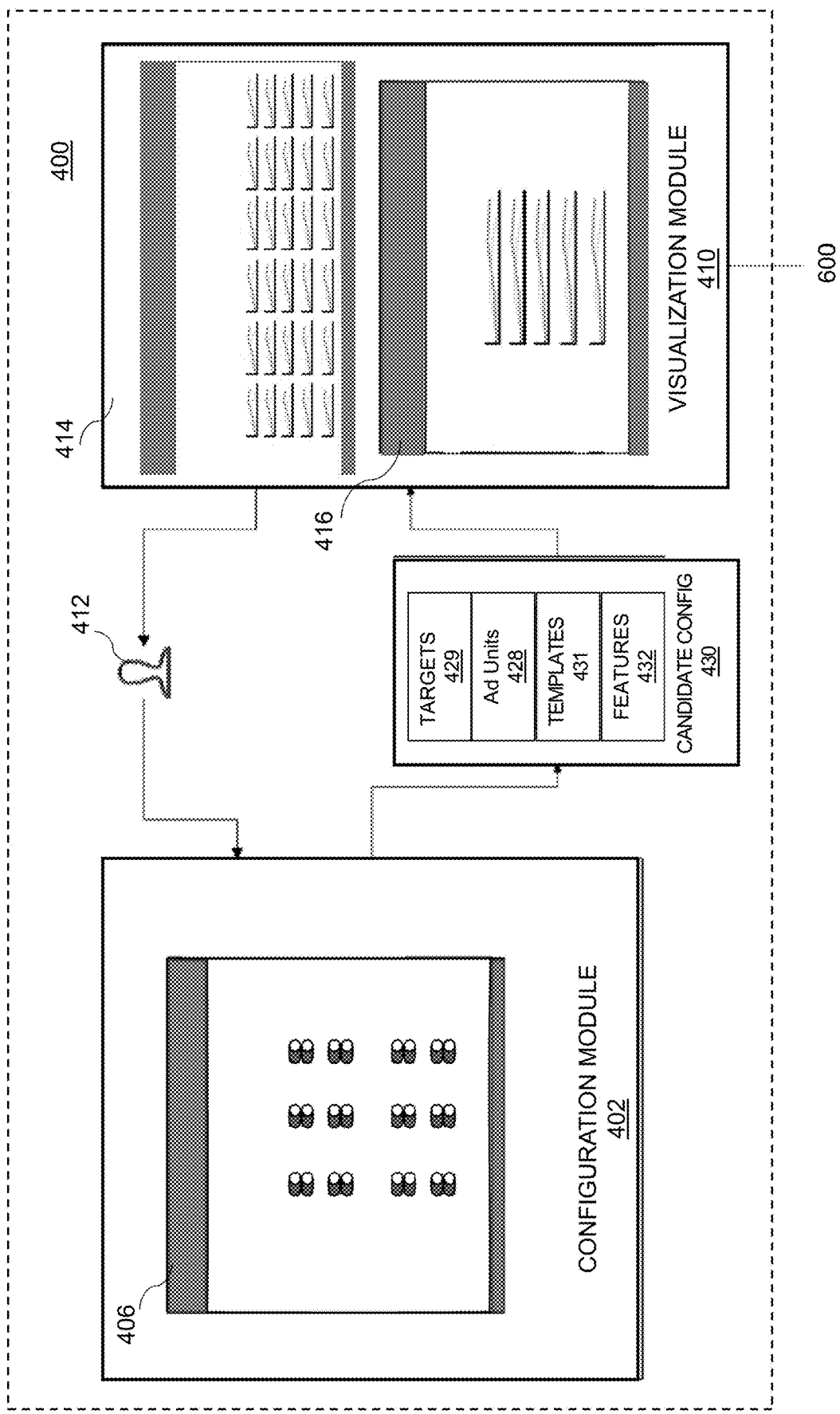
FIG. 6 is a block diagram of an exemplary management platform according to an embodiment of the invention.

Management Platform 400, shown in FIG. 6, includes two main modules, a configuration module 402 and a visualization module 410. Visualizations, which are displayed via a user interface (UI) to a human administrator 412 come out of the Analytics Module 600 and primarily relate to revenue production, fill rate, impression volume, win rate and bid rate of the Ad Unit in each config. The user interface of visualization module 410 also allows the administrator 412 to view the results of the MAB exploration and exploitation in ML Module 500 in real time as well as the criteria that form the MAB matrix.

Figure 7:
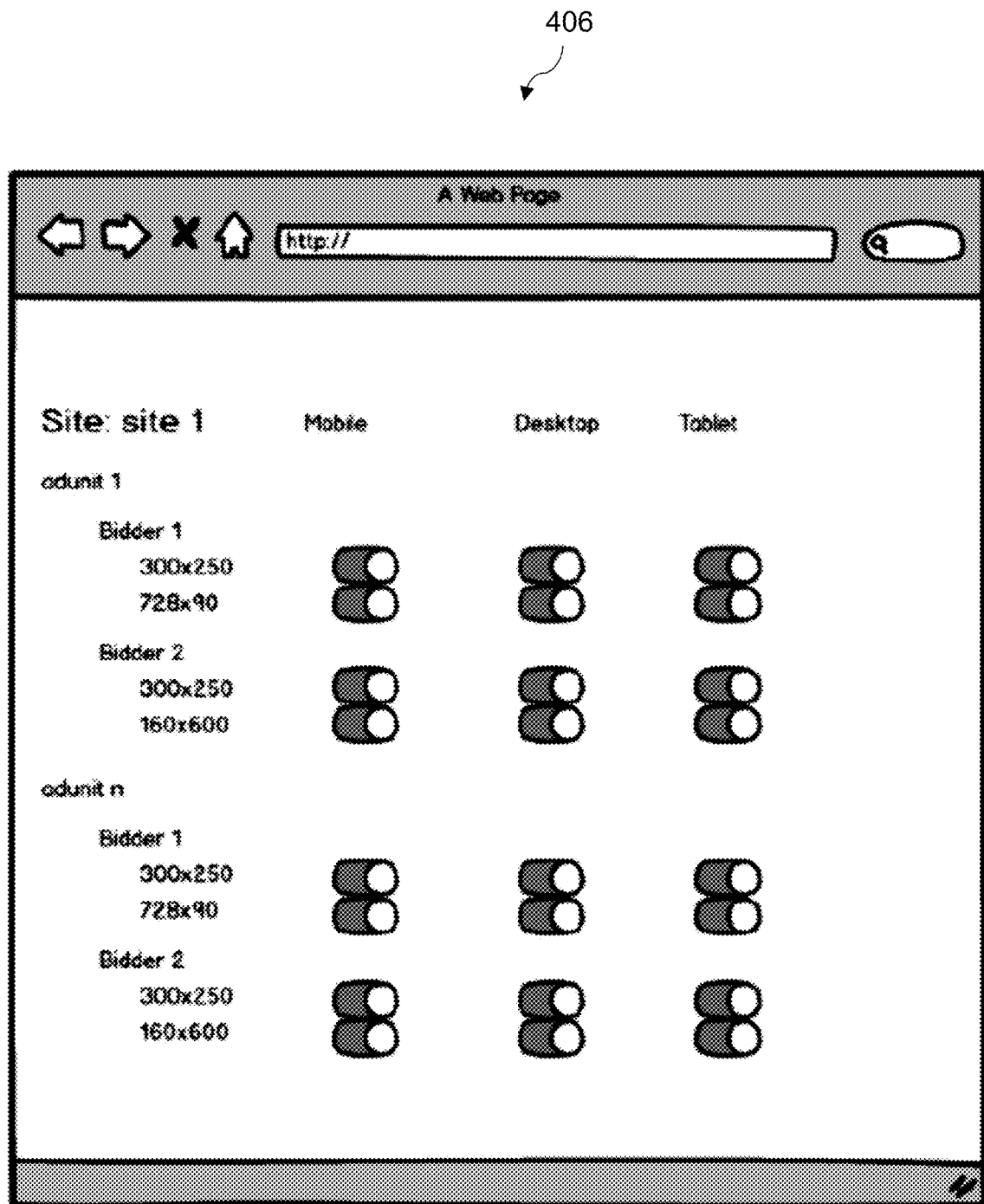
FIG. 7 is an example screen shot of a toggle matrix screen for an embodiment of a base config.
Figure 8:
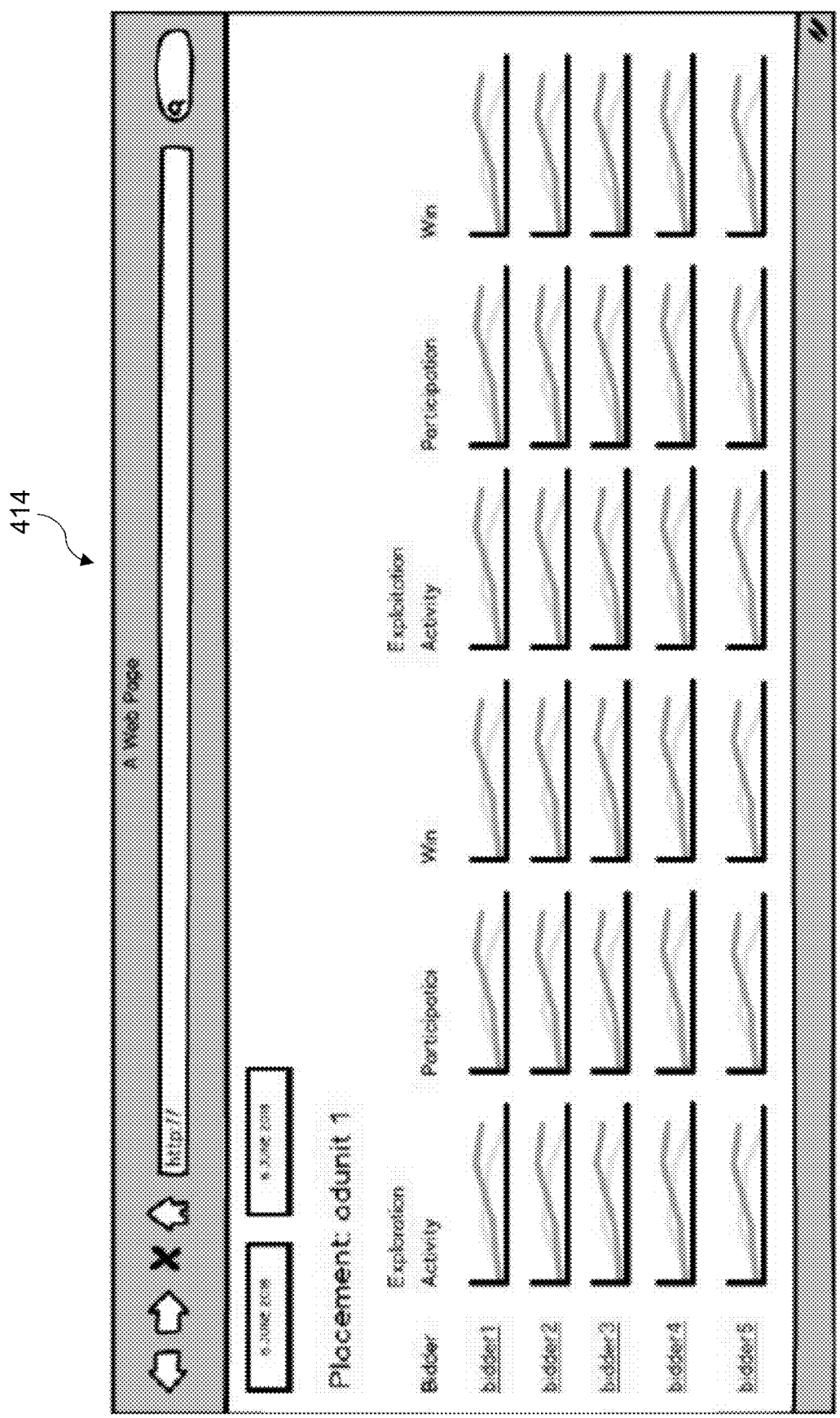
FIG. 8 is an example screen shot of a performance display for the analytics viewer.
Figure 9:
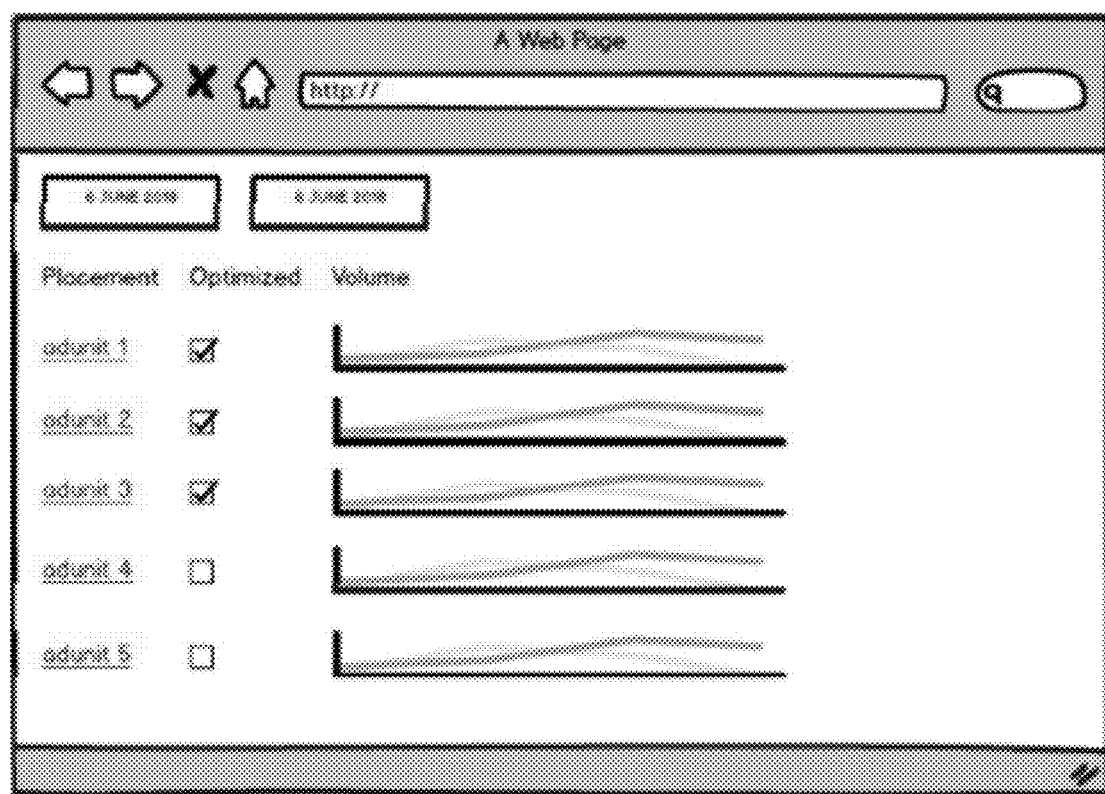
FIG. 9 provides an example screenshot for the ad unit optimization.

In the illustrated example, visualization module 410 may display various bid details, e.g. placement for Ad Units 414, shown in more detail in FIG. 8, or Ad Unit optimization 416, shown in more detail in FIG. 9. In configuration module 402, a selection screen 406, for example a toggle matrix screen 406, shown in more detail in FIG. 7, can be displayed for management input and control of the config.

Using the UI of the visualization module 410 and the configuration module 402, the administrator or manager 412 can create a candidate config 430, which includes targets, Ad Units, templates and features. A candidate config 430 is the highest level of bid participants in the auction that have been determined to be likely provide value. The machine learning algorithm in Machine Learning Module 500 does not select which bid participant to put in the front of the queue for candidate config 430 and does not make decisions as to which participant to completely remove—this function is performed the human manager 412 interacting by way of the visualization module 410 to generate inputs and settings in the Configuration Module 402. The resulting candidate config 430 is input into the Optimization Module 300 and includes the targets 429, such as the site and position preferences, i.e., the place in which the advertisement is to be displayed. Within each Ad Unit 428, coding is provided to indicate the particular placement on the site where the ad will appear. A template 431 includes a configurable set of options related to the pre-bid version along with the related Javascript to deploy it to the page. The features 432 are the actual configuration of that script, such as the list of candidate bidders, their responsive configuration, as well as which bidders are involved in the particular config. The ML algorithms do not optimize below this level. Rather, it makes decisions about which of the different candidate configs to include based on predictions 321 (see, e.g., FIG. 5).

Figure 10:
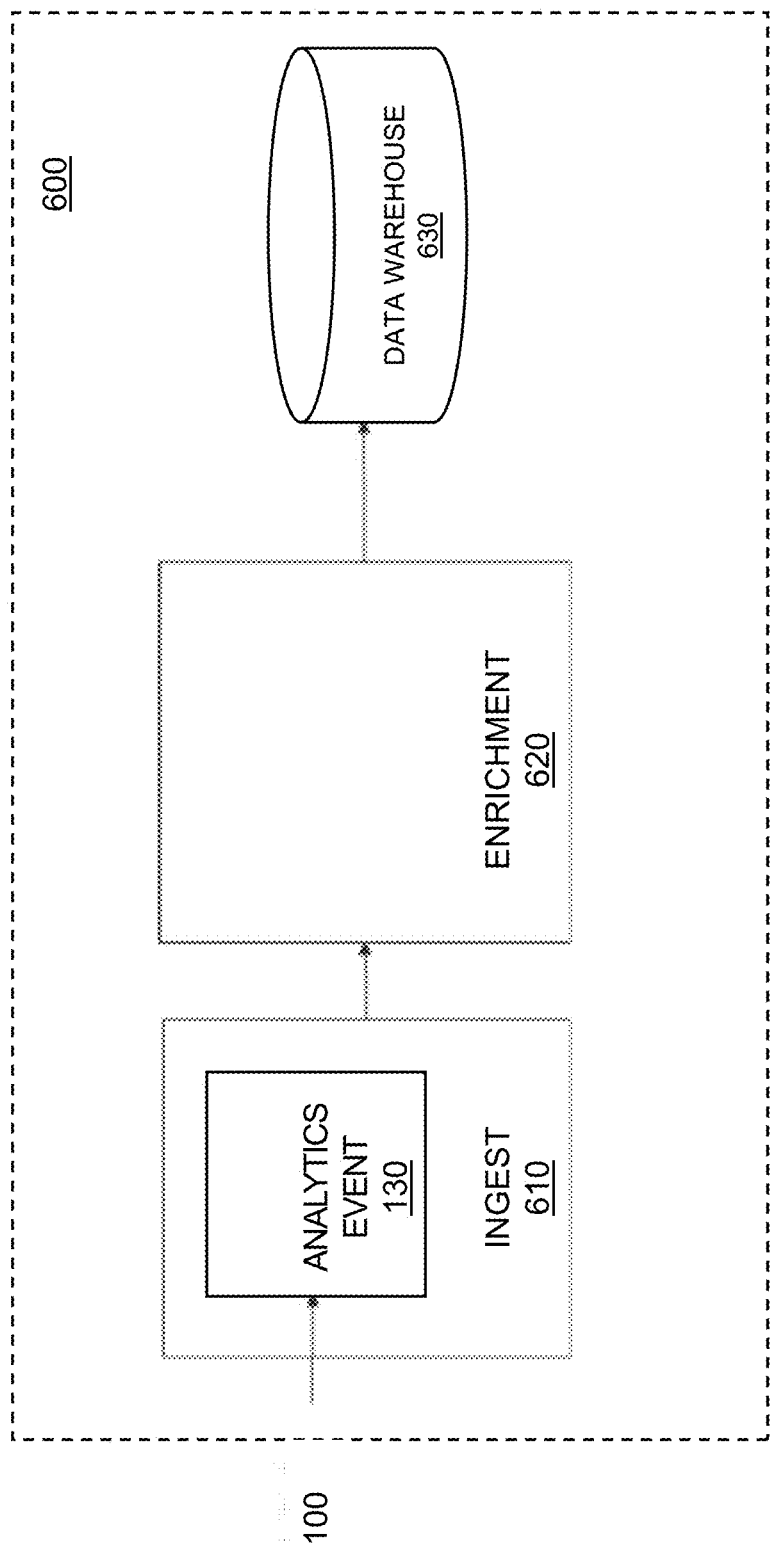
FIG. 10 is a block diagram of an exemplary analytics module according to an embodiment of the invention.

Analytics Module 600 is illustrated in FIG. 10. Analytics Module 600 takes analytics events 130 from Client Environment 100. As previously defined, analytics events 130 include a combination of client attributes 110 and specific analytics event data 120. The analytics event 130 goes into ingest module 610, which in some embodiments is stored in a high-volume messaging bus, such as GOOGLE® Cloud Pub/Sub, a scalable, durable event ingestion and delivery system that serves as a foundation for stream analytics pipelines. Alternatives that may be used include AMAZON KINESIS®, APACHE KAFKA®, or any number of other readily available high-speed messaging buses. From ingestion 610, the enrichment platform 620 consumes those messages. The primary role of the enrichment platform 620 is to clean up dates, make sure dates are in the right format for the data warehouse 630. In addition, enrichment platform takes IP information and may augment it with additional environmental and user information from the source, e.g., geographic information, network and device performance (speed, language, etc.), as well as parsing URLs into their proper format. Any amount of enrichment available from the attributes and the data can be done at this point. In an exemplary embodiment, the data captured by analytics ingestion 610 is used to initialize the auction activity and various bid-related actions, which may include requesting a bid, a bid response, bid timeout, and bid won. Exemplary data for initializing the auction include time, user identification, user location, user device type, and other data that may be used to assist in identifying appropriate content. Data relevant to bid-related actions include time, bidder identity and location, ad characteristics, such as media type, placement, size, etc.

The inventive system employs highly scalable stream and batch data processing architecture, e.g., GOOGLE® Cloud DataFlow, or similar managed lambda architecture, for handling massive quantities of data for transformation and enrichment, which provide high performance/low latency throughput with windowing. The results of the enrichment 620 is output into data warehouse 630 for accessing by Machine Learning Module 500.

Figure 11:
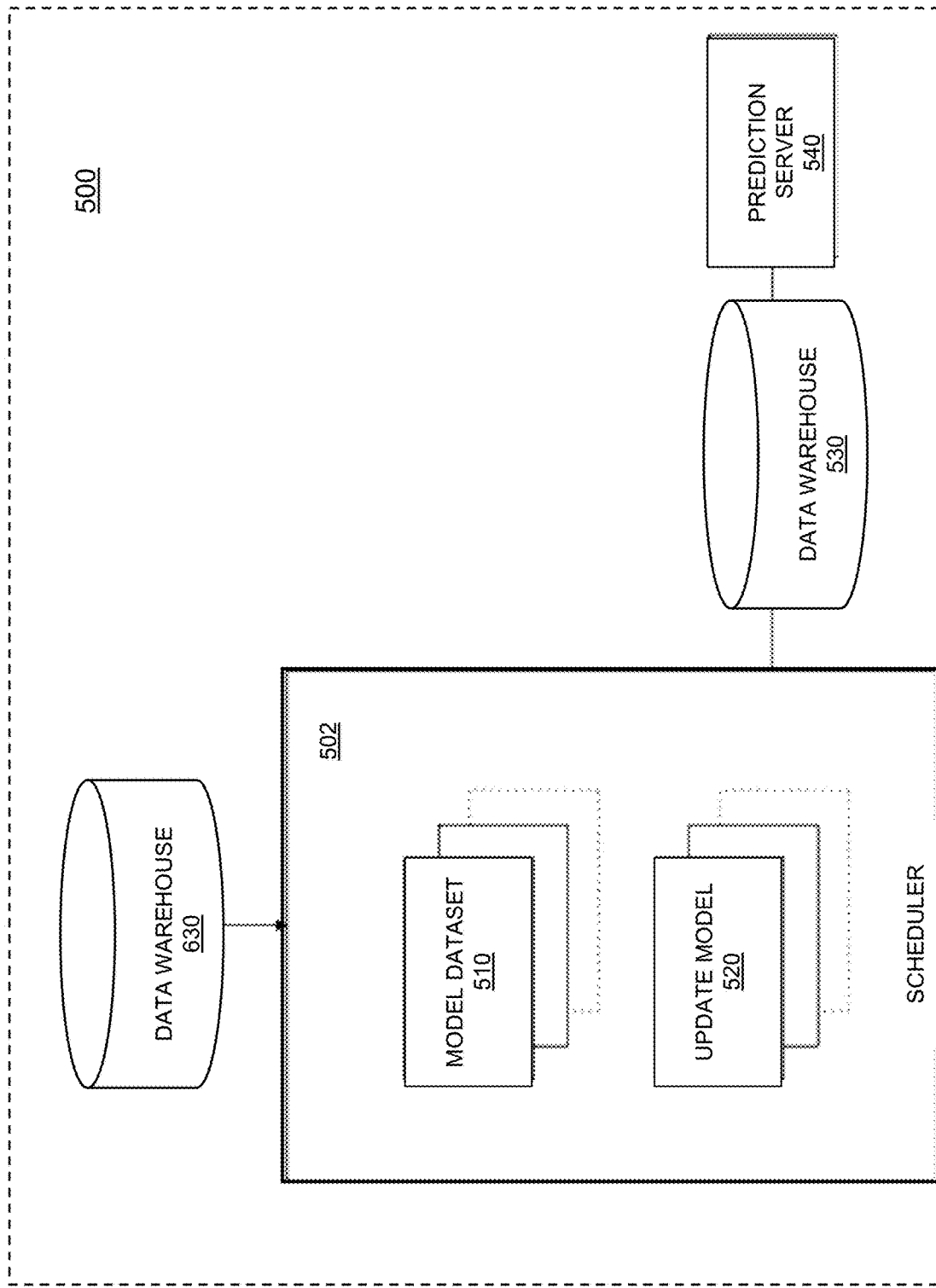
FIG. 11 is a block diagram of an exemplary machine learning module according to an embodiment of the invention.

Referring to FIG. 11, the functional components of Machine Learning Module 500 are shown. Machine Learning Module 500 is primarily tasked with regularly scheduling creation of model data sets within scheduler 502, updating models and taking data from a data warehouse 630, creating the model data set 510, which is a cleaned regular data set, generating an updated model 520 from the model data set 510, and outputting the result to data warehouse 530. These operations can occur either manually or on a regular schedule, or some combination of both. In one implementation, the update model 520 can be periodically updated on a regular basis, e.g., daily, every few days, or every few hours, and then can be updated on demand after evaluation from a human manager, which evaluation itself may be an action that is scheduled, e.g., weekly, daily, etc. The output of scheduler 502 is output into the data warehouse 530 for input into prediction server 540, which generates predictions. This approach differs from other real-time and inline prediction systems, which tend to involve more latency. The inventive approach performs at least some of the calculations in advance of performing the machine learning operations to formulate the predictions, then stores those calculations so that the results can be embodied in a device, such as a router, or saved in storage, then using the programmable CDN 220 to connect it back together and maintain a performance profile. Using this approach, none of the machine learning elements introduce a delay as the result of a need to wait for complex predictions to be calculated.

Figure 12:
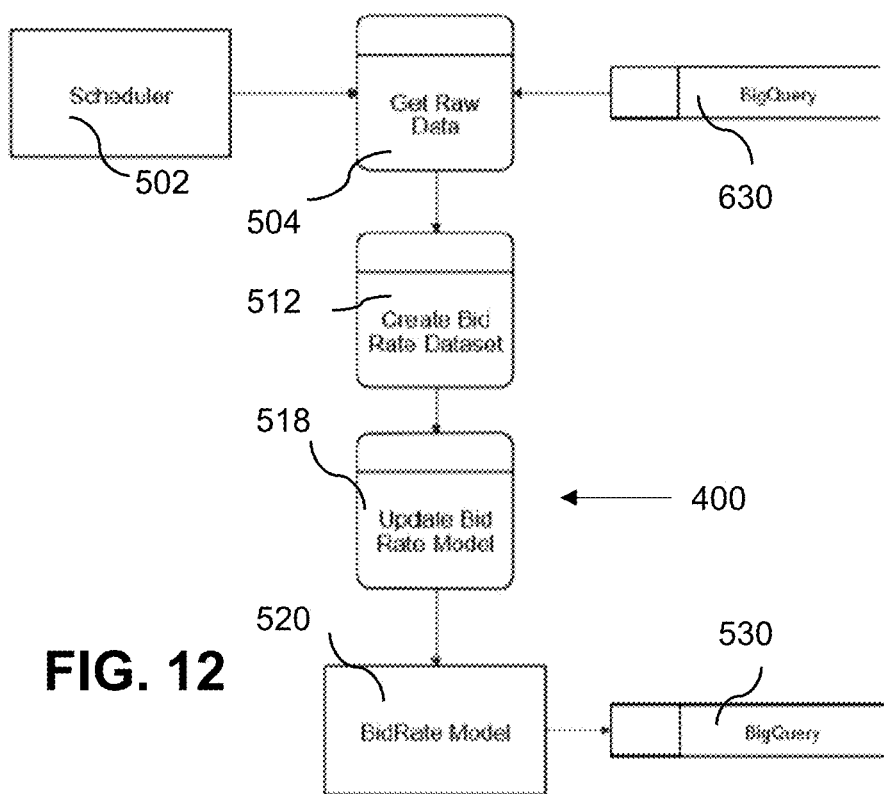
FIG. 12 is a block diagram of an example of a process flow for model creation according to an embodiment of the inventive platform.

Referring to FIG. 12, a sample scheduler 502 sequence is provided for an exemplary model. It should be noted that this is only one of several models that might be implemented in the inventive platform. Generally, such models will be tailored to the stated preferences of a particular publisher or partner, or groups thereof. In the illustrated example, in step 504, scheduler 502 collects raw data from data warehouse 630, In the figure, the data warehouse is indicated to be GOOGLE® BigQuery data analytics platform, however, other similar platforms may be used, including AMAZON REDSHIFT®, IBM DB2, and others. The raw data is retrieved from the warehouse based on rules for this particular model, which, in this case is concerned with bid rate and expected value. In other words, are they going to bid, i.e., what is their bid rate, and what do we expect their bid to be? In step 512, the scheduler 502 creates bid rate model dataset 510 which is used in step 518 to update the bid rate model to generate updated bid rate model 520. There is a primary relationship between two attributes that allows site-specific business rules to be applied to conform to the publishers' priorities or preferences. For example, some publishers may have a preference of value over bid rate. This is where human intervention in Management Platform 400 occurs to add into the Configuration Module 402, e.g., by selecting appropriate settings that the publisher prefers one over the other. This effectively inserts a rule for this publisher that if a bidder ever bids high, they should be included. This choice is implemented in the Optimization Module 300 as optimized script 340, where different thresholds being selected for weighting in favor of what this publisher wishes to take for purposes of the prediction.

Referring again to FIG. 11, the data received at datastore 630 is input into Machine Learning module 500. The machine learning pathway incorporates a continuous reinforcement learning process to drive the exploration phase for development of prediction model. One of the primary challenges in header bidding optimization is exploration of the optimization space. In an exemplary embodiment, the Machine Learning (ML) module 500 is used to implement a contextual adversarial multi-armed bandit (MAB) with bandit arms defined by the config generator module 310 in Optimization Module 300. The ML module 500 processes the options, historical bidding data, and analytics events 130 to develop a probability, i.e., prediction, of bids that are likely to be successful for similar situations.

Exploration is balanced as a percentage of traffic. This is because the "core" naive case is well known. The percentage can be picked by customer willingness or an arbitrary value. Higher percentages facilitate training and will optimize faster. The percentage can be changed over time as learning progresses. Choosing which other "arm" of the MAB to "pull" has many algorithmic options. These options may include the LinUCB (Upper Confidence Bound) algorithm, which is described by Li, et al. in "A Contextual-Bandit Approach to Personalize News Article Recommendation", arXiv:1003.0146v2 [cs.LG] 1 Mar. 2012, the disclosure of which is incorporated herein. While LinUCB may be the simplest and most robust for purposes of the invention, other options include NeuralBandit (R. Allesiardo, et al., "A Neural Networks Committee for the Contextual Bandit Problem", arXiv:1409.8191v1 [cs.NE] 29 Sep. 2014, incorporated herein by reference) and KernelUCB (M. Valko, "Finite-Time Analysis of Kernelised Contextual Bandits", arXiv:1309.6869 [cs.LG] 26 Sep. 2013, incorporated herein by reference.)

Figure 13:
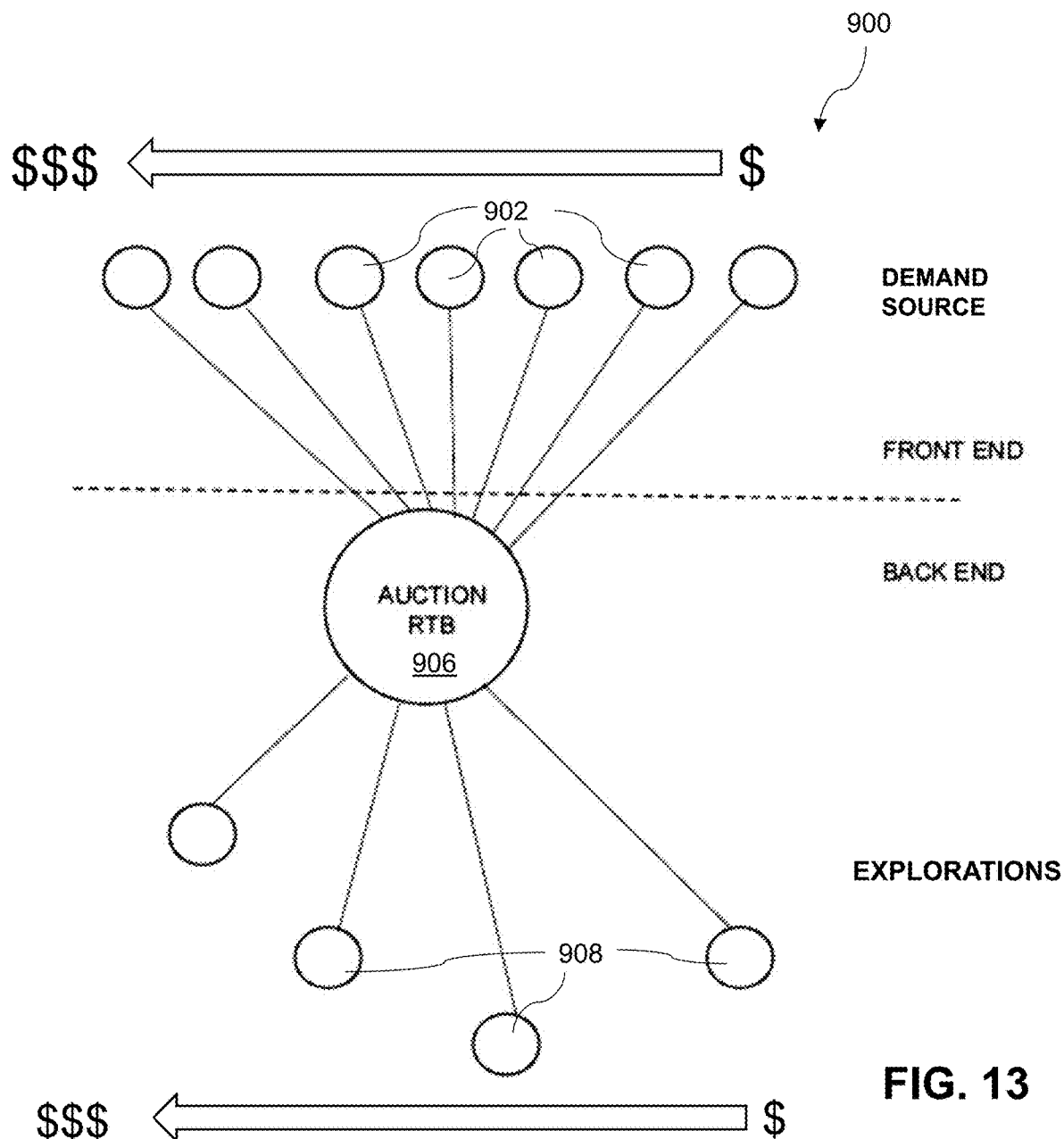
FIG. 13 is a diagrammatic view of an exemplary "multi-armed bandit" (MAB) approach according an embodiment of the inventive platform.

FIG. 13 illustrates the general concept behind the multi-armed bandit (MAB) algorithm 900 that is executed within the ML module 200. In general, this means that a pull is whichever arm the bandit has determined provides the greatest value. All "pulls" within a MAB are exploitation if they are not exploration. According to the inventive approach, each arm or lever 908 of the MAB 900 corresponds to an exploration config. Various algorithms have been devised to handle an exploration-exploitation trade-off. A MAB model can be described as follows: there are k arms, and choosing an arm gives an independent and identically distributed reward from a fixed unknown probability distribution that depends on the arm. In various embodiments, choosing an arm i gives no information about any other arm j, and therefore, i≠j. In some embodiments, an administrator of the algorithm is tasked with obtaining a maximum possible reward in N rounds, where, in each round, the administrator chooses one arm of the k arms, and obtains an independent and identically distributed reward associated with an arm distribution. In an embodiment of the inventive system, each arm 908 of the bandit represents an option for optimal configuration. The lever pulls are processed by the upstream RTB auctions 906, which interact with upstream demand partners 902 and then recorded in the analytics module 600 and evaluated in the optimization module 300 for later inclusion or exclusion as optimized configs.

In some embodiments, the system may use a combination of either simple epsilon-greedy (ϵ-greedy), epsilon-decreasing, or contextual epsilon algorithms to explore the possibility space while concurrently exploiting determined maximal values. These are among a number of strategies that are known in the art to provide an approximate solution to the MAB problem. Briefly, they can be described as follows: 1) epsilon-greedy strategy: The best lever or arm is selected for a proportion 1−ϵ of the trials, and a lever is selected at random (with uniform probability) for a proportion E; 2) epsilon-first strategy: A pure exploration phase is followed by a pure exploitation phase. For N trials in total, the exploration phase occupies EN trials and the exploitation phase (1−ϵ)N trials. During the exploration phase, a lever or arm is randomly selected (with uniform probability); during the exploitation phase, the best lever is always selected; 3) epsilon-decreasing strategy: Similar to the epsilon-greedy strategy, except that the value of ϵ decreases as the experiment progresses, resulting in highly explorative behavior at the start and highly exploitative behavior at the finish; 4) adaptive epsilon-greedy strategy based on value differences (VDBE): Similar to the epsilon-decreasing strategy, except that epsilon is reduced on basis of the learning progress instead of manual tuning; 5) contextual-epsilon-greedy strategy, which is similar to the epsilon-greedy strategy, except that the value of ϵ is computed regarding the situation in experiment processes, which allow the algorithm to be Context-Aware. It is based on dynamic exploration/exploitation and can adaptively balance the two aspects by deciding which situation is most relevant for exploration or exploitation, resulting in highly explorative behavior when the situation is not critical and highly exploitative behavior at critical situation. Other variants of the MAB problem are known in the art and may be implemented by the ML module 500.

In some embodiments, the ML module uses historical bidding data to predict future successful bids. Attributes used in this machine learning approach include the bidder, the client device, and the time of day. The volume of the training data is typically very large. An efficient method based on Bayesian inference was developed for this embodiment of the ML system 500.

The Bayes Theorem provides a general framework for many machine learning systems. The basic idea behind Bayesian methods is to update beliefs based on evidence. To provide an illustrative example in the context of digital advertising, as more data is gathered by showing different ads to other clients and observing bids, it is possible to incrementally narrow the width of the probability distribution. Let D be the training data and h the hypothesis to learn. By Bayes Theorem.

$$P(h \mid D) = \frac{P(D \mid h)P(h)}{P(D)}$$

As in all Bayesian inference, a prior must be chosen. The prior provides a preliminary belief of what is true before there is any evidence. This is the starting point; the beliefs will be updated as more evidence is collected, and a posterior distribution is computed. Even though the posterior probability gives the theoretically optimal prediction, its computation is usually impractical. Additional assumptions on the likelihood and the prior probability are necessary to derive practical algorithms.

If the distributions are assumed to be Gaussian, the posterior is also Gaussian and can be computed analytically. This leads to a technique known as Gaussian process regression, "kriging", or Wiener-Kolmogorov prediction.

Because a Gaussian distribution is determined by its mean and covariance, the key element of the method is the covariance function, also called the kernel, as in other machine learning techniques such as support vector machines. A kernel function is a symmetric, positive definite function that serves as a measure of similarity between input data points. The kriging algorithm can be computationally intensive especially for large training sets, because of its operation of a matrix inverse.

An assumption in the Bayes model that can significantly simplify the computation is the conditional independence of different attributes in the likelihood function.

$$P(a_1, a_2, \ldots, a_k \mid y = v_j) = \prod_{i=1}^{k} P(a_i \mid y = v_j)$$

This method is known as the Naïve Bayes algorithm. The training algorithm is fast and suitable for large data sets. However, the assumption of this method ignores the potential correlations between the attributes.

The "time of day" attribute is periodic. The standard kernel functions such as the radial basis function (RBF) kernel do not have the periodic property and could produce an inaccurate measure of similarity. For example, the time stamp of 2:00 is closer to 23:00 than to 10:00 because of the period of 24. This fact will not be reflected in a standard kernel function, i.e., $e^{-(2-23)^2} < e^{-(2-10)^2}$ To address this problem, we developed the following kernel function that provides proper measures for periodic functions of period T.

$$k(x, y) = \cos\frac{2\pi}{T}(x - y)$$

This is a valid kernel function because:

$$\cos\frac{2\pi}{T}(x - y) = \cos\frac{2\pi}{T}x \cos\frac{2\pi}{T}y + \sin\frac{2\pi}{T}x \sin\frac{2\pi}{T}y$$

A function of the form f(x)f(y) is a kernel and a positive linear combination of two kernels is a kernel. This kernel function faithfully reflects the periodic nature of the data. For example, in the time of day case, this periodic kernel provides more reasonable measures:

$$\cos\frac{2\pi}{24}(2 - 23) = \frac{\sqrt{2}}{2} > -\frac{1}{2} = \cos\frac{2\pi}{24}(2 - 10)$$

According to an embodiment of the inventive system, a bidding prediction algorithm is obtained by combining the techniques of kriging and a Naïve Bayes algorithm. The overall training is based on the Naïve Bayes algorithm. The probability estimation for time of day is based on kriging and the periodic function kernel. The training within this machine learning pathway (scheduler 502) generates an updatable model 520 for on-line real-time response for estimating or predicting successful future bids. The next step is to optimize them using the bandit algorithm.

The configuration script delivered to the page is a focus of each arm of the MAB. Each arm represents the possible configuration script based on the combination of options. The context and payoff are managed in each successive "pull" and measure as "regret". The interaction of these processes is referred to as "exploitation" and "exploration".

A candidate config 430 such as the example shown in FIG. 6 can be used to describe the possible ways in which an ad slot can be monetized. This represents ad size set and bidder.

To provide an example, if a page has three ad slots, each slot is considered independently, and each set of possible options defined by the candidate config 430 is considered a "pullable arm" in the MAB 900. The aspects of the client are added to this mix to form the context, which is referred to as a "contextual bandit."

One of the primary challenges in header bidding optimization is exploration of the optimization space. Given the following situation:
1. 3 Page Variations
   a. 4 possible ad placements
   b. 4 ad sizes
2. 100 geographies
3. 20 Bidders
4. 0-10,000 Bid Timeout
5. 0-10,000 Page Timeout
6. 1-6 Bidder Concurrency
7. 3 major device groups, one would have a potential optimization space of over 172.8 trillion possibilities. This space is far too large to explore linearly, while also exploiting the naive solutions.

In some embodiments of the inventive platform, the configuration is grouped into exploration regions.
1. Region 1: Ad Delivery
   a. Page Variations
      i. Ad Placements
      ii. Ad Sizes
   b. Bidder
2. Region 2: Page Configuration
   a. Bid Timeout
   b. Page Timeout
   c. Bidder Concurrency.

In all cases, the following parameters obtained from the analytics sources are available for consideration related to optimization.
   d. Geography
   e. Internet Speed
   f. Device
   g. Site The inventive Demand Path Optimization (DPO) system takes into account all or many of the following features while optimizing for revenue capture:
1. Page Variants
   a. Ad Placement Set
   b. Ad Size Set
2. Geographic Location
3. Specific Ad Size
4. Bidder
5. Bid Timeout
6. Page Timeout
7. Concurrent Bidders
8. Device
9. Total Page Latency
10. Prebid version
11. Server or Client Side Header Bidding Location
12. Server side bidder cohorts
13. Ad Loading Behavior
14. Lazy Loading
15. Browser Type
16. Browser Version
17. Language
18. Ad Blocking status
19. Time of Day, morning, midday, afternoon
20. Quarter
21. Month
22. Year
23. Budgetary Allocation Period (early, late, mid, etc.)
24. Tracking Cookie Status, existence, non-existence
25. User Segment Data
26. Browser Language
27. Visit Session Depth
28. Ad Interaction
29. Conversion Data
30. First Party Site Data—logged in, user segments, etc.

Figure 14:
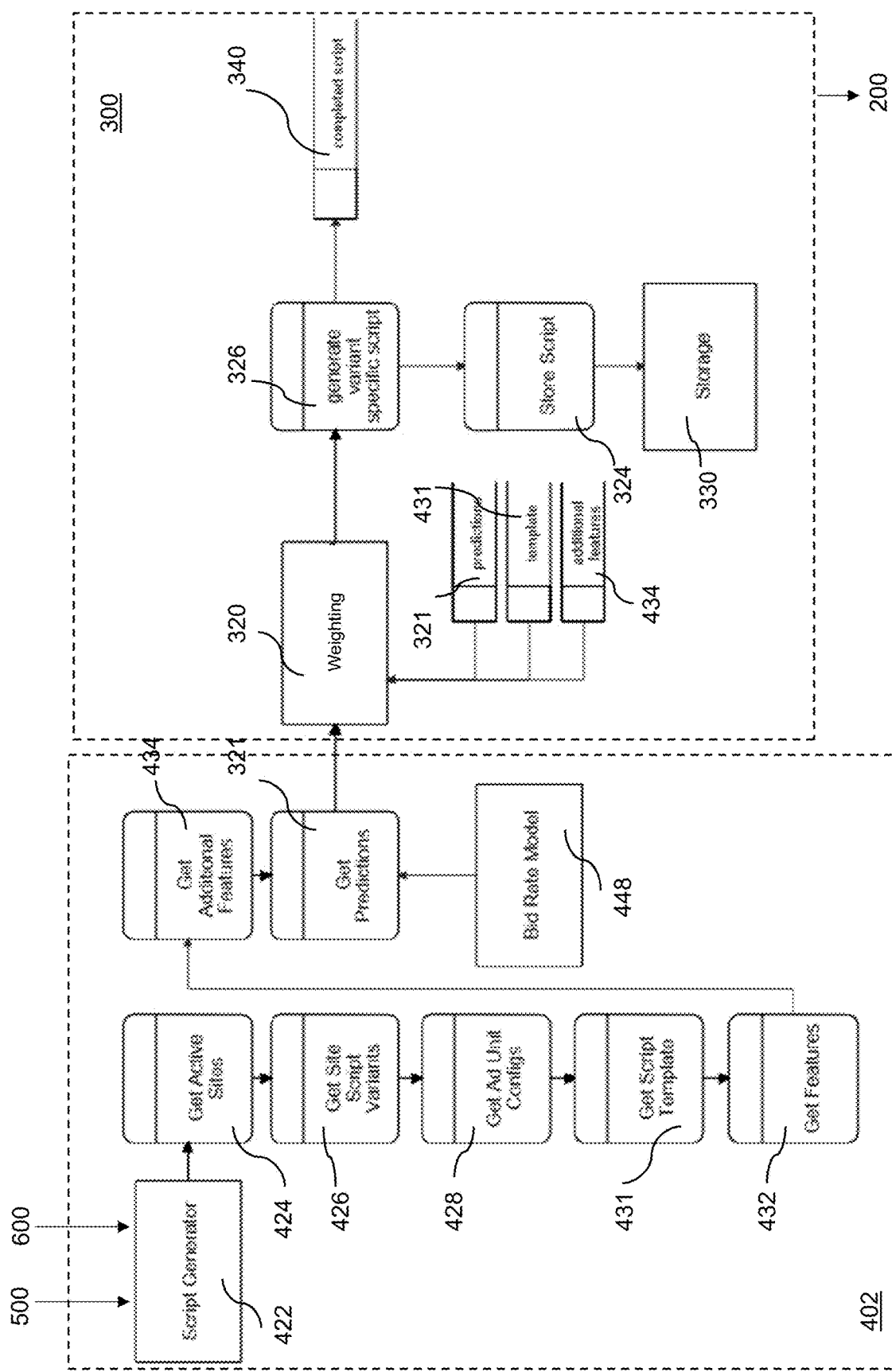
FIG. 14 is a block diagram of an exemplary header bidding script generation model employing weighting according to an embodiment of the inventive platform.

FIG. 14 illustrates an exemplary data flow for both script generation and script output as would be carried out by the Optimization Module 300 (FIGS. 4,5) after receiving the output of Configuration Module 402 (FIG. 6). From the data and predictions received from Analytical Module 600 and ML Module 500, configuration module 402 executes a script generator 422 to retrieve information relevant to the decision of what should be included a script. This information includes identification of active sites 424, available site script variants 426, from config generator module 310 (see FIG. 4): Ad Unit configs 428, script templates 431, and features 432 (candidate config 430), additional features 434, and obtains predictions 321 from bid rate model 448 in ML Module 500. The combined results of Configuration Module 402 are input into the weights module 320 in Optimization Module 300. The weights module 320 looks at the predictions 321, templates 431 and additional features 434 and generates a variant specific script 326, outputting a complete script 340 which, when instructed, is delivered to Deployment Module 200. In step 324, the script generated in step 326 is stored in file storage 330.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

Figure 15:
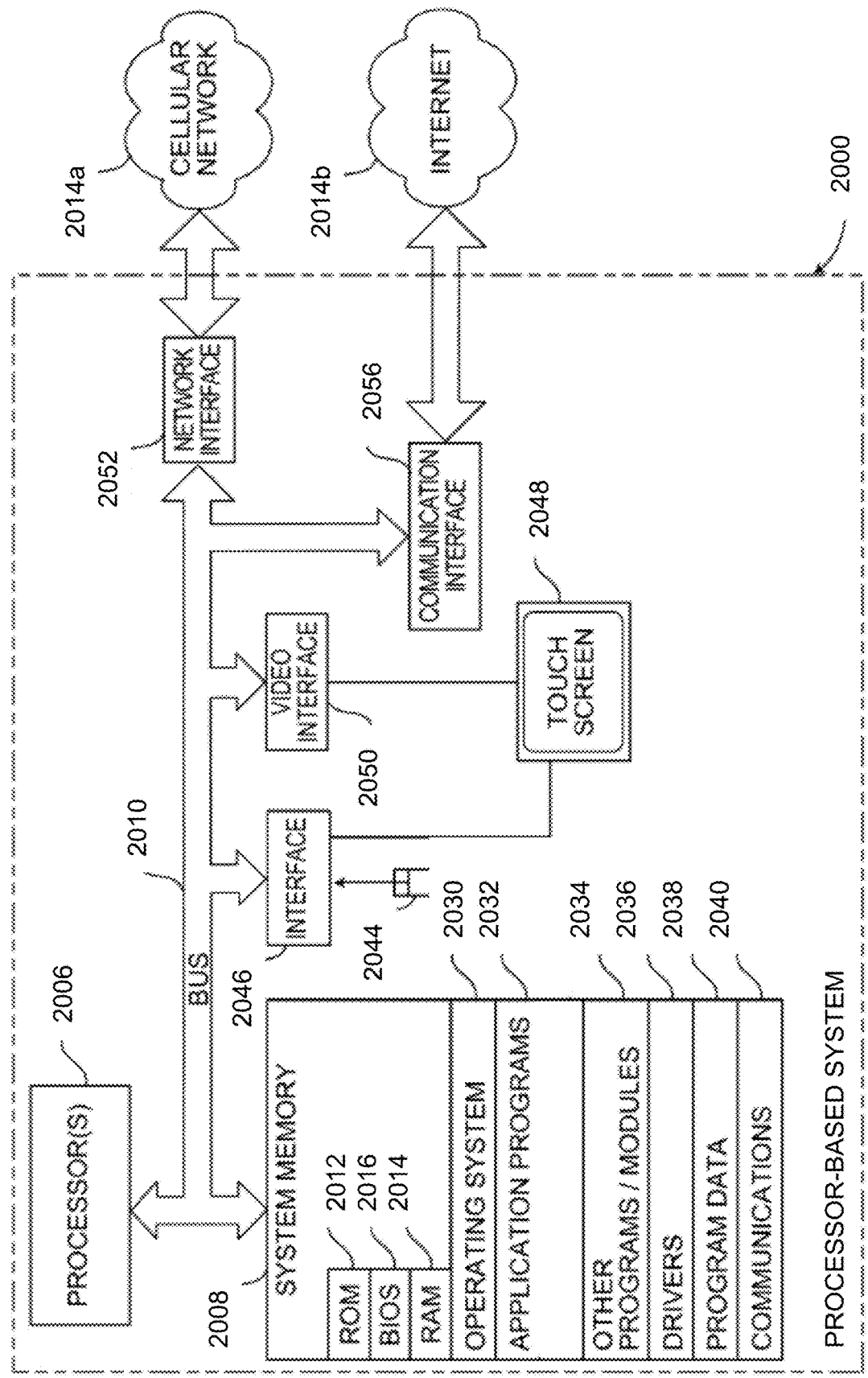
FIG. 15 is a block diagram of an embodiment of the processor-based system that may be used to implement the inventive platform.

FIG. 15 illustrates an example of a processor-based system 2000 that may be used to implement embodiments of the inventive platform described herein. Some embodiments may be described in the general context of processor-executable instructions or logic, such as program application modules, objects, or macros being executed by one or more processors. Those skilled in the relevant art will appreciate that the described embodiments, as well as other embodiments, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

The processor-based system may, for example, take the form of a smartphone or tablet computer, which includes one or more processors 2006, a system memory 2008 and a system bus 2010 that links various system components including the system memory 2008 to the processor(s) 2006. The system 2000 may be a single system or more than one system or other networked computing device.

The processor(s) 2006 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 17 are of conventional design. As a result, such blocks need not be described in further detail herein, as they will be understood by those skilled in the relevant art.

The system bus 2010 can employ any known bus structures or architectures, including a memory bus with memory controller, a peripheral bus, and a local bus. The system memory 2008 includes read-only memory ("ROM") 2012 and random access memory ("RAM") 2014. A basic input/output system ("BIOS") 2016, which can form part of the ROM 2012, contains basic routines that help transfer information between elements within system 2000, such as during start-up. Some embodiments may employ separate buses for data, instructions and power.

The system 2000 may also include one or more solid state memories, for instance Flash memory or solid state drive (SSD) 2018, which provides nonvolatile storage of computer-readable instructions, data structures, program modules and other data for the system 2000. Although not depicted, the system can employ other non-transitory computer- or processor-readable media, for example a hard disk drive, an optical disk drive, or memory card media drive.

Program modules can be stored in the system memory 2008, such as an operating system 2030, one or more application programs 2032, other programs or modules 2034, drivers 2036 and program data 2038.

The system memory 2008 may also include communications programs 2040, for example a server and/or a Web client or browser for permitting the system 2000 to access and exchange data with other systems such as client computing systems, websites on the Internet, corporate intranets, or other networks.

The operating system 2030, application programs 2032, other programs/modules 2034, drivers 2036, program data 2038 and server and/or browser 2040 can be stored on any other of a large variety of non-transitory processor-readable media (e.g., hard disk drive, optical disk drive, SSD and/or flash memory.

A client can enter commands and information via a pointer, for example through input devices such as a touch screen 2048, or via a computer mouse or trackball 2044 which controls a cursor. Other input devices can include a microphone, joystick, game pad, tablet, scanner, biometric scanning device, etc. These and other input devices (i.e., "I/O devices") are connected to the processor(s) 2006 through an interface 2046 such as a touch-screen controller and/or a universal serial bus ("USB") interface that couples user input to the system bus 2010, although other interfaces such as a parallel port, a game port or a wireless interface or a serial port may be used. The touch screen 2048 can be coupled to the system bus 2010 via a video interface 2050, such as a video adapter to receive image data or image information for display via the touch screen 2048.

The system 2000 operates in a networked environment using one or more of the logical connections to communicate with one or more remote computers, servers and/or devices via one or more communications channels, for example, one or more networks 2014a, 2014b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based system 2004 may include one or more network, wired or wireless communications interfaces 2052, 2056 (e.g., network interface controllers, cellular radios, Wi-Fi radios, Bluetooth radios) for establishing communications over the network, for instance the Internet 2014b or cellular network 2014a.

In a networked environment, program modules, application programs, or data, or portions thereof, can be stored in a server computing system (not shown). For convenience, the processor(s) 2006, system memory 2008, and network and communications interfaces 2052, 2056 are illustrated as communicably coupled to each other via the system bus 2010, thereby providing connectivity between the above-described components. In some embodiments, system bus 2010 may be omitted and the components are coupled directly to each other using suitable connections.

While the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The invention claimed is:

1. A digital advertising system, comprising:
   at least one processor configured to execute a plurality of functional modules comprising:
   an analytics module configured to receive and analyze client attributes associated with a website visitor and a requested website to define an analytics event therefrom, wherein the analytics module comprises an enrichment platform for formatting and augmenting data and is further configured to ingest and enrich data within the analytics event;

a machine learning module configured to receive an enriched analytics event and generate one or more prediction models to indicate a probability of success of a bidding prediction for the enriched analytics event, wherein the machine learning module comprises a scheduler configured for creating and updating model data sets for use in generating the one or more prediction models, wherein the model data sets are stored in a data warehouse associated with the machine learning module in advance of generating the one or more prediction models, and wherein the scheduler periodically updates the model data sets in advance of generating subsequent prediction models;

a management platform comprising a configuration module for receiving the bidding prediction and generating one or more candidate configs based upon the bidding prediction and pre-selected features of an advertisement, an optimization module configured for receiving the one or more candidate configs and applying weights and additional features to select a config from the one or more candidate configs and generate a plurality of optimized scripts using the selected config; and a deployment module configured for receiving the plurality of optimized scripts and deliver a selected script of the plurality of optimized scripts to the website visitor.

2. The system of claim 1, wherein the management platform further comprises a visualization module including a user interface for monitoring and control by a human administrator.

3. The system of claim 2, wherein the user interface includes selection screens for entering bidding preferences and ad characteristics.

4. The system of claim 1, wherein the machine learning module generates prediction models using one or more machine learning algorithms selected from the group consisting of multi-armed bandits, naïve Bayes classifiers, decision trees, expert systems, genetic algorithms, graph analytics, linear regression, logistic regression, Markov chain Monte Carlo methods, neural networks, random forests, and support vector machines.

5. The system of claim 1, wherein the machine learning module generates prediction models using a multi-armed bandit (MAB) exploration and exploitation algorithm, wherein arms of the MAB represent configuration script options.

6. The system of claim 5, wherein the ad options comprise ad delivery and ad placement.

7. The system of claim 1, wherein the machine learning module generates predictions models using a combination of Bayesian inference and a kriging algorithm.

8. The system of claim 1, wherein the weights applied by the optimization module are determined by machine learning.

9. The system of claim 1, wherein the weights applied by the optimization module are pre-determined within the management platform according to a website publisher's preference.

10. The system of claim 9, wherein the pre-determined weights are determined by site-specific thresholds.

11. The system of claim 1, wherein the one or more candidate configs are at least partially generated using settings entered by a human administrator via the management platform.

12. The system of claim 1, wherein the optimization module selects the selected config according to a plurality of features selected from page variations, number of bidders, number of geographies, bid timeout, page timeout, bidder concurrency and client device type.

13. A method for digital advertising, comprising:
storing non-transitory machine readable code in at least one processor causing the at least one processor to configured to execute a plurality of functional modules comprising:

an analytics module configured to receive and analyze client attributes associated with a website visitor and a requested website to define an analytics event therefrom, wherein the analytics module further operates to ingest and enrich data within the analytics event;

a machine learning module configured to receive an enriched analytics event and generate one or more prediction models to indicate a probability of success of a bidding prediction for the enriched analytics event, wherein the machine learning module comprises a scheduler configured for generating and updating model data sets for use in generating the one or more prediction models, wherein the model data sets are stored in a data warehouse associated with the machine learning module in advance of generating prediction models, and wherein the scheduler periodically updates the model data sets in advance of generating the prediction models;

a management platform comprising a configuration module for receiving the bidding prediction and generating one or more candidate configs based upon the bidding prediction and pre-selected features of an advertisement, an optimization module configured for receiving the one or more candidate configs and applying weights and additional features to select a config from the one or more candidate configs and generate a plurality of optimized scripts using the selected config; and a deployment module configured for receiving the plurality of optimized scripts and deliver a selected script of the plurality of optimized scripts to the website visitor.

14. The method of claim 13, wherein the management platform further comprises a visualization module including a user interface for monitoring and control by a human administrator.

15. The method of claim 13, wherein the machine learning module generates prediction models using one or more machine learning algorithms selected from the group consisting of multi-armed bandits, naive Bayes classifiers, decision trees, expert systems, genetic algorithms, graph analytics, linear regression, logistic regression, Markov chain Monte Carlo methods, neural networks, random forests, and support vector machines.

16. The method of claim 13, wherein the machine learning module generates prediction models using a multi-armed bandit (MAB) exploration and exploitation algorithm, wherein arms of the MAB represent configuration script options.

17. The method of claim 13, wherein the machine learning module generates predictions models using a combination of Bayesian inference and a kriging algorithm.

18. The method of claim 13, wherein the weights applied by the optimization module are determined by machine learning.

19. The method of claim 13, wherein the weights applied by the optimization module are pre-determined within the management platform according to a website publisher's preference.

20. The method of claim 19, wherein the pre-determined weights are determined by site-specific thresholds.

21. The method of claim 13, wherein the one or more candidate configs are at least partially generated using settings entered by a human administrator via the management platform.

22. The method of claim 13, wherein the optimization module selects the selected config according to a plurality of features selected from page variations, number of bidders, number of geographies, bid timeout, page timeout, bidder concurrency and client device type.

23. The system of claim 3, wherein the model data sets comprise a publisher's bidding preferences.

24. The system of claim 1, wherein the analytics module further comprises an analytics module data warehouse configured for storing formatted and augmented data from the enrichment platform, and wherein the scheduler generates updated model data sets by periodically accessing updated data from the analytics module data warehouse.

25. The method of claim 13, wherein the model data sets comprise a publisher's bidding preferences.

26. The method of claim 13, wherein the analytics module further comprises an analytics module data warehouse configured for storing formatted and augmented data from the enrichment platform, and wherein the scheduler generates updated model data sets by periodically accessing data from the analytics module data warehouse.

* * * * *